(12) United States Patent
Fu

(10) Patent No.: US 12,279,121 B2
(45) Date of Patent: Apr. 15, 2025

(54) METHOD FOR UNLOCKING TERMINAL DEVICE BY WEARABLE DEVICE AND COMMUNICATION SYSTEM

(71) Applicant: Honor Device Co., Ltd., Shenzhen (CN)

(72) Inventor: Yingke Fu, Shenzhen (CN)

(73) Assignee: HONOR DEVICE CO, LTD., Shenzhen (CN)

( * ) Notice: Subject to any disclaimer, the term of this patent is extended or adjusted under 35 U.S.C. 154(b) by 0 days.

(21) Appl. No.: 17/922,401

(22) PCT Filed: May 24, 2022

(86) PCT No.: PCT/CN2022/094776
§ 371 (c)(1),
(2) Date: Oct. 31, 2022

(87) PCT Pub. No.: WO2023/279877
PCT Pub. Date: Jan. 12, 2023

(65) Prior Publication Data
US 2024/0129742 A1    Apr. 18, 2024

(30) Foreign Application Priority Data

Jul. 8, 2021   (CN) .......................... 202110771731.6

(51) Int. Cl.
*H04W 12/33* (2021.01)
*G06F 21/32* (2013.01)
*G06F 21/35* (2013.01)

(52) U.S. Cl.
CPC ............ *H04W 12/33* (2021.01); *G06F 21/32* (2013.01); *G06F 21/35* (2013.01)

(58) Field of Classification Search
None
See application file for complete search history.

(56) References Cited

U.S. PATENT DOCUMENTS 10,108,272 B1    10/2018   Debates et al.
10,524,110 B1 *  12/2019   Klem ................. H04W 8/005
(Continued)

FOREIGN PATENT DOCUMENTS

CN    105487669 A    4/2016
CN    106778113 A    5/2017
(Continued)

*Primary Examiner* — Benjamin E Lanier
(74) *Attorney, Agent, or Firm* — Conley Rose, P.C.

(57) ABSTRACT

This application provides a method for unlocking a terminal device by a wearable device and a communication system. The method includes establishing, by the wearable device, a binding relationship with the terminal device when the wearable device is in a being-worn state; removing, by the wearable device, the binding relationship with the terminal device in response to determining that a wearing status of the wearable device is changed; generating, by the wearable device, motion data that matches a motion track of the wearable device, in response to a user making a motion with the wearable device; sending, by the wearable device, an unlock request to the terminal device in response to determining that the motion data matches preset reference data; and performing, by the terminal device, an unlock operation in response to receiving the unlock request and determining that the terminal device displays an unlock screen.

20 Claims, 31 Drawing Sheets

(56) References Cited

U.S. PATENT DOCUMENTS

| | | | |
|---|---|---|---|
| 2016/0092668 A1 | 3/2016 | Ding et al. | |
| 2017/0083091 A1* | 3/2017 | Okamoto | G06F 3/0383 |
| 2017/0140381 A1* | 5/2017 | Ducrohet | H04L 63/0853 |
| 2017/0344737 A1 | 11/2017 | Tang | |
| 2019/0251238 A1 | 8/2019 | Venkatraman et al. | |
| 2022/0237274 A1* | 7/2022 | Paul | G06F 21/32 |

FOREIGN PATENT DOCUMENTS

| | | | |
|---|---|---|---|
| CN | 108804006 A | 11/2018 | |
| CN | 111866266 A | 10/2020 | |
| CN | 113641967 A | 11/2021 | |
| EP | 3321834 B1 * | 4/2021 | G06F 21/32 |
| WO | 2017113383 A1 | 7/2017 | |

* cited by examiner

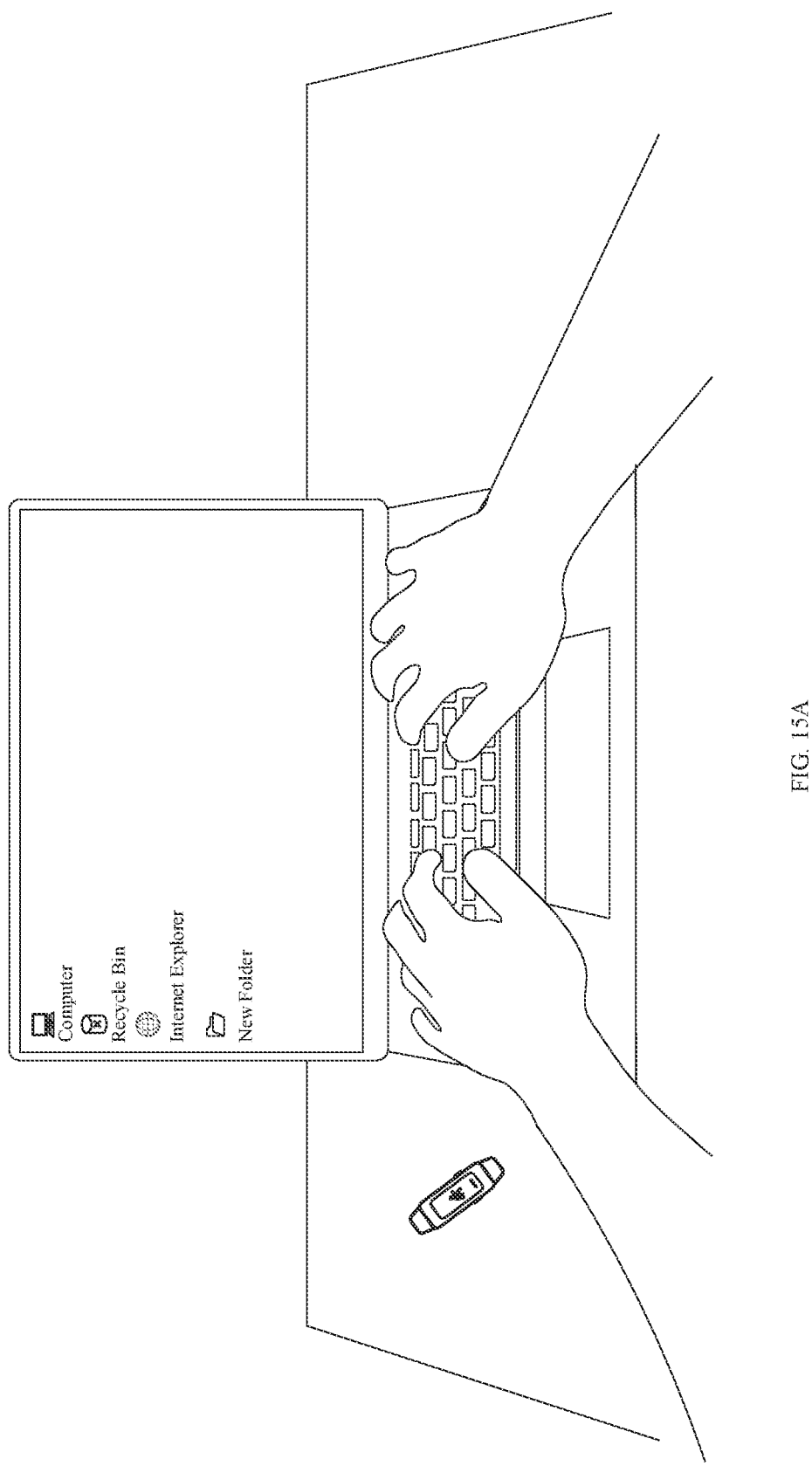

(a)

(b)

METHOD FOR UNLOCKING TERMINAL DEVICE BY WEARABLE DEVICE AND COMMUNICATION SYSTEM

CROSS-REFERENCE TO RELATED APPLICATIONS

This application is a U.S. National Stage of International Application No. PCT/CN2022/094776 filed on May 24, 2022, which claims priority to Chinese Patent Application No. 202110771731.6, filed with the China National Intellectual Property Administration on Jul. 8, 2021, both of which are incorporated herein by reference in their entireties.

TECHNICAL MUD

This application relates to the terminal field, and in particular, to a method for unlocking a terminal device by a wearable device and a communication system.

BACKGROUND

With the rapid development of terminal intelligence, terminal devices involve sensitive information such as business secrets and personal privacy on an increasing scale. Therefore, users usually set passwords for terminal devices. For example, users set startup passwords, lock screen passwords, and the like for devices such as computers, mobile phones, and tablets. In actual use, users often need to perform screen locking and unlocking operations on terminal devices. In this case, the users need to input passwords frequently for unlocking. Such an unlocking method is cumbersome and affects user experience.

SUMMARY

This application provides a method for unlocking a terminal device by a wearable device and a communication system to unlock a terminal device by using a wearable device.

To achieve the foregoing objective, the following technical solutions are used in this application.

According to a first aspect, this application provides a method for unlocking a terminal device by a wearable device, which is applied to a communication system that includes a wearable device and a terminal device. The method includes: when the wearable device is in a being-worn state, establishing, by the wearable device, a binding relationship with the terminal device, where the binding relationship is used to indicate that the wearable device and the terminal device are bound by using a preset account name and a preset password; re-establishing, by the wearable device, a binding relationship with the terminal device in response to determining that a wearing status of the wearable device is changed from the being-worn state to a not-being-worn state; generating, by the wearable device, motion data that matches a motion track of the wearable device, in response to an operation of a user making a motion with the wearable device; sending, by the wearable device, an unlock request to the terminal device in response to determining that the motion data matches preset reference data; and performing, by the terminal device, an unlock operation in response to receiving the unlock request and determining that the terminal device is on an unlock screen.

Based on the method provided in embodiments of this application, an owner of the wearable device can be authenticated, and a motion of the user can be detected by using the wearable device. In this way, when it is detected that (motion data corresponding to) the motion of the user is consistent with (reference data corresponding to) a preset unlock motion, and the owner of the wearable device is authenticated successfully, the unlock operation performed on the terminal device is completed. In the entire unlock process, the user can unlock the terminal device merely through a motion without manually inputting a password, which is convenient and fast and improves user experience. In addition, the owner of the wearable device needs to be authenticated, and the unlock operation can be performed only when the authentication is successful. This can effectively avoid that an unrelated user unlocks the terminal device by using the wearable device, so that security of the terminal device is guaranteed.

In a possible implementation, the establishing, by the wearable device, a binding relationship with the terminal device includes: displaying, by the terminal device, a first prompt box, where the first prompt box is used to prompt the user to establish the binding relationship between the wearable device and the terminal device, and the first prompt box includes a first option; displaying, by the terminal device, a second prompt box in response to an operation performed by the user on the first option, where the second prompt box is used to remind the user of wearing the wearable device, and the second prompt box includes a second option; sending, by the wearable device, wearing status information to the terminal device in response to that the user has worn the wearable device, where the wearing status information is used to indicate that the wearable device is in the being-worn state; displaying, by the terminal device, a password input prompt box in response to an operation performed by the user on the second option and reception of the wearing status information; and establishing, by the terminal device, the binding relationship with the wearable device in response to an operation of the user inputting the preset password in the password input prompt box.

Based on the method provided in the embodiments of this application, the wearable device can establish the binding relationship with the terminal device when in the being-worn state, implementing authentication of a wearer of the wearable device.

In a possible implementation, the establishing, by the terminal device, the binding relationship with the wearable device in response to an operation of the user inputting the preset password in the password input prompt box includes: displaying, by the terminal device, a third prompt box in response to the operation of the user inputting the preset password in the password input prompt box, where the third prompt box is used to prompt the user to perform a confirm operation in the wearable device and establishing, by the terminal device, the binding relationship with the wearable device in response to the confirm operation performed by the user in the wearable device.

It can be learned that the user also needs to perform the confirm operation in the wearable device in the process of establishing the binding relationship.

In a possible implementation, after the terminal device establishes the binding relationship with the wearable device, the method further includes: displaying, by the terminal device, a fourth prompt box, where the fourth prompt box is used to prompt the user to set the reference data, and the fourth prompt box includes a third option; generating, by the wearable device, first motion data that matches a motion track of the wearable device and sending the first motion data to the terminal device, in response to an operation of the user making a motion with the wearable device; displaying, by the terminal device, the fourth prompt box again in response to the terminal device receiving the first motion data and an operation performed by the user on the third option; generating, by the wearable device, second motion data that matches a motion track of the wearable device and sending the second motion data to the terminal device, in response to an operation of the user making a motion with the wearable device again; sending, by the terminal device, a reference data setting instruction to the wearable device in response to the operation performed by the user on the third option and determining that the first motion data matches the second motion data; and setting, by the wearable device, the second motion data as the reference data in response to a password setting instruction.

Based on the method provided in the embodiments of this application, the user can set an unlock motion voluntarily. In addition, in the process of setting an unlock motion, the user can be provided with a plurality of opportunities to set an unlock motion, and motion data corresponding to a track of an unlock motion is used as the reference data only when all the set unlock motions are consistent, which can effectively avoid that the user incorrectly sets an unlock motion due to an error motion.

In a possible implementation, the method further includes: displaying, by the terminal device, a fifth prompt box in response to the operation performed by the user on the third option and determining that the first motion data matches the second motion data, where the fifth prompt box is used to prompt the user that the terminal device can be unlocked by using the wearable device.

Based on the method provided in the embodiments of this application, after an unlock motion is set, the user can be prompted that the terminal device can be unlocked by using the wearable device, which enables the user to know whether the setting has been completed.

In a possible implementation, after the terminal device establishes the binding relationship with the wearable device, the method further includes displaying, by the terminal device, a sixth prompt box, where the sixth prompt box is used to prompt the user that the terminal device has established the binding relationship with the wearable device.

Based on the method provided in the embodiments of this application, after the terminal device establishes the binding relationship with the wearable device, the user can be prompted that the terminal device has established the binding relationship with the wearable device, so that the user can continue to set an unlock motion.

In a possible implementation, after the terminal device establishes the binding relationship with the wearable device, the method further includes: generating, by the wearable device, biometric feature information in response to an unlock operation performed by the user, where the biometric feature information includes at least one of fingerprint information or face information; and sending, by the wearable device, an unlock request to the terminal device in response to determining that the biometric feature information matches preset biometric standard information.

Based on the method provided in the embodiments of this application, the user can further identify biometric feature information (such as fingerprint and face information) of the user by using the wearable device and send an unlock request to the terminal device after determining that the biometric feature information matches the preset biometric standard information. In other words, the terminal device can be unlocked in a manner such as fingerprint unlocking or face unlocking, which is also simple and convenient.

In a possible implementation, the method further includes: displaying, by the terminal device, a first screen, where the first screen includes the first option, the second option, and the third option; displaying, by the terminal device, a second screen in response to the operation performed by the user on the first option, where the second screen is used to provide the user with a manner of setting reference data and/or biometric standard information used for unlocking the terminal device; displaying, by the terminal device, a third screen in response to the operation performed by the user on the second option, where the third screen is used to provide the user with a manner of setting a password used for unlocking a preset file; and displaying, by the terminal device, a fourth screen in response to the operation performed by the user on the third option, where the fourth screen is used to provide the user with a manner of setting a password used for unlocking a preset application.

Based on the method provided in the embodiments of this application, by using the terminal device, the user can set passwords used for unlocking the terminal device, a file, and an application. Therefore, the user wearing a smart band 402 can make different motions to implement operations of unlocking the terminal device, the file, and the application.

According to a second aspect, embodiments of this application provide a method for unlocking a terminal device by a wearable device, which is applied to a wearable device. The method includes: when the wearable device is in a being-worn state, establishing, by the wearable device, a binding relationship with a terminal device, where the binding relationship is used to indicate that the wearable device and the terminal device are bound by using a preset account name and a preset password; re-establishing, by the wearable device, a binding relationship with the terminal device in response to determining that a wearing status of the wearable device is changed from the being-worn state to a not-being-worn state; generating, by the wearable device, motion data that matches a motion track of the wearable device, in response to an operation of a user making a motion with the wearable device; and sending, by the wearable device, an unlock request to the terminal device in response to determining that the motion data matches preset reference data, where the unlock request is used to indicate the terminal device to perform an unlock operation when the terminal device is on an unlock screen.

According to a third aspect, embodiments of this application provide a method for unlocking a terminal device by a wearable device, which is applied to a terminal device. The method includes performing, by the terminal device, an unlock operation in response to receiving an unlock request sent by a wearable device and determining that the terminal device is on an unlock screen.

According to a fourth aspect, embodiments of this application provide a communication system, including a wearable device and a terminal device. The wearable device performs the method according to any implementation in the first aspect and the second aspect. The terminal device performs the method according to any implementation in the first aspect and the third aspect.

According to a fifth aspect, embodiments of this application provide a computer readable storage medium, including computer instructions.

When the computer instructions run in a wearable device, the wearable device is enabled to perform the method according to any implementation in the first aspect and the second aspect.

Alternatively, when the computer instructions run in a terminal device, the terminal device is enabled to perform the method according to any implementation in the first aspect and the third aspect.

According to a sixth aspect, embodiments of this application provide a chip system, where the chip system includes one or more interface circuits and one or more processors. The interface circuit and the processor are interconnected by a line. The chip system may be applied to an electronic device that includes a communication module and a memory. The interface circuit may read instructions stored in a memory of a wearable device and send the instructions to the processor. When the instructions are executed by the processor, the wearable device is enabled to perform the method according to any implementation in the first aspect and the second aspect. The interface circuit may also read instructions stored in a memory of a terminal device and send the instructions to the processor. When the instructions are executed by the processor, the terminal device is enabled to perform the method according to any implementation in the first aspect and the third aspect.

It can be understood that the communication system in the fourth aspect, the computer readable storage medium in the fifth aspect, and the chip system in the sixth aspect that are provided above are all configured to perform the corresponding methods provided above. Therefore, for beneficial effects that can be achieved by the communication system, the computer readable storage medium, and the chip system, refer to beneficial effects of the corresponding methods provided above. Details are not described herein again.

BRIEF DESCRIPTION OF DRAWINGS

FIG. 15A is a schematic diagram of a scenario;

DESCRIPTION OF EMBODIMENTS

Hereinafter, the terms "first" and "second" are intended only for description and shall not be understood as an indication or implication of relative importance or an implicit indication of a quantity of indicated technical features. Therefore, a feature defined by "first" or "second" may explicitly or implicitly include one or more features. In the description of the embodiments, "a plurality of" means at least two, unless otherwise specified.

The following describes implementations of the embodiments with reference to accompanying drawings.

Figure 1:
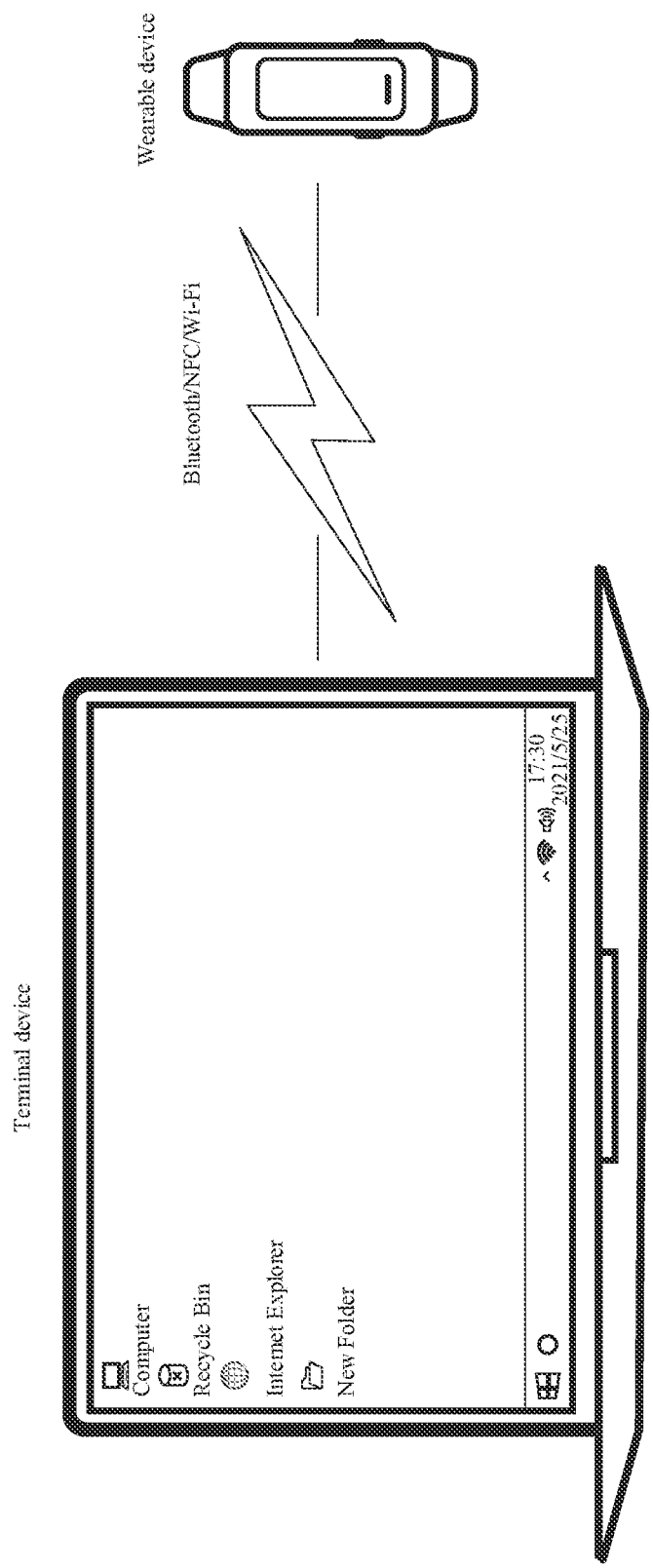
FIG. 1 is a schematic diagram of an architecture of a communication system according to an embodiment of this application.

FIG. 1 is a schematic diagram of an architecture of a communication system according to an embodiment of this application. As shown in FIG. 1, the communication system includes a terminal device and a wearable device.

The terminal device may communicate with the wearable device through a wireless local area network (wireless local area networks, WLAN) (for example, a wireless fidelity (wireless fidelity, Wi-Fi) network), bluetooth (including classic bluetooth BR/EDR (basic rate/enhanced data rate) and bluetooth low energy (bluetooth low energy, BLE)), near field communication (near field communication, NFC), or the like.

For example, the wearable device in this embodiment of this application may be a device such as a smart watch or a smart band. This is not limited in this embodiment of this application.

For example, the terminal device in this embodiment of this application may be specifically a device such as a mobile phone, a tablet computer, a television, a notebook computer, an ultra-mobile personal computer (ultra-mobile personal computer, UMPC), a handheld computer, a netbook, or a personal digital assistant (personal digital assistant, PDA), This is not limited in this embodiment of this application.

Figure 2A:
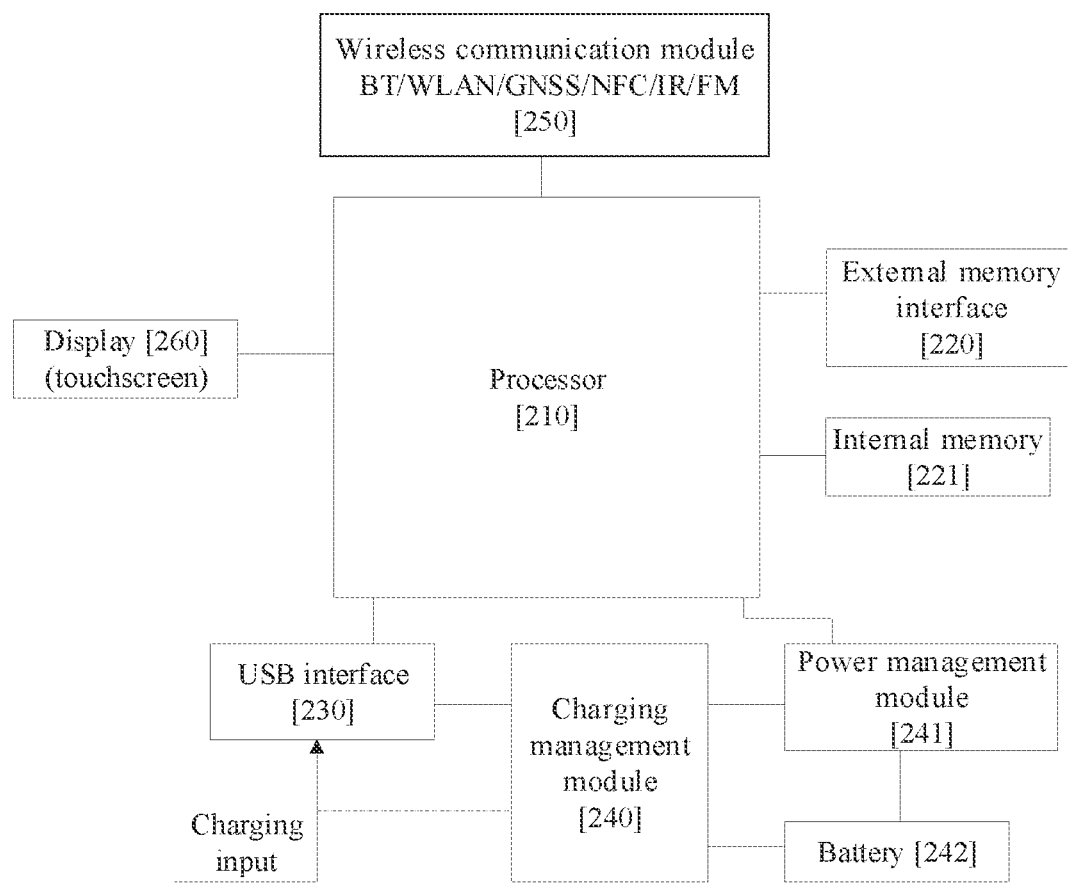
FIG. 2A is a schematic structural diagram of a terminal device according to an embodiment of this application.
Figure 2B:
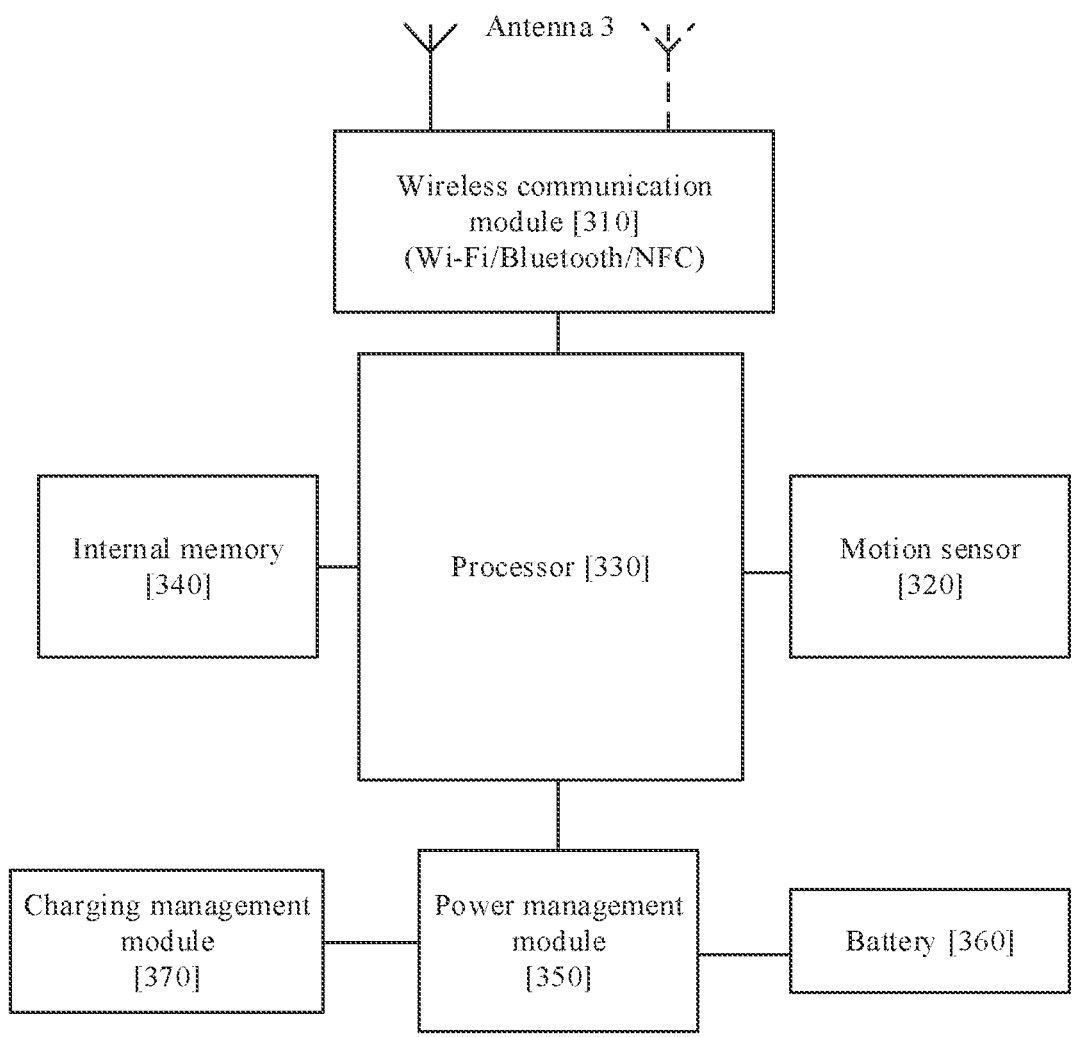
FIG. 2B is a schematic structural diagram of a wearable device according to an embodiment of this application.

FIG. 2A is a schematic structural diagram of a terminal device. As shown in FIG. 2A, the terminal device 200 may include a processor 210, an external memory interface 220, an internal memory 221, a universal serial bus (universal serial bus, USB) interface 230, a charging management module 240, a power management module 241, a battery 242, a wireless communication module 250, and a display 260.

It can be understood that the structure illustrated in this embodiment does not constitute any specific limitation on the first electronic device. In some other embodiments, the first electronic device may include more or fewer components than those shown in the figure or combine some components, or split some components, or have different component arrangements. The components shown in the figure may be implemented in hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate components or integrated in one or more processors.

The controller may be a nerve center and a command center of the terminal device 200. The controller may generate an operation control signal according to an instruction operation code and a timing signal to complete control of instruction fetching and execution.

A memory may be further provided in the processor 210 and is configured to store an instruction and data. In some embodiments, the memory in the processor 210 is a cache memory. The memory may store an instruction or data that has just been used or cyclically used by the processor 210, If the processor 210 needs to use the instruction or data again, the processor 210 may invoke the instruction or data directly from the memory. Therefore, repeated access is avoided, waiting time of the processor 210 is reduced, and efficiency of the system is improved.

In some embodiments, the processor 210 may include one or more interfaces. The interface may include an I2C interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a USB interface.

It can be understood that the interface connection relationship between the modules illustrated in this embodiment is merely illustrative and does not constitute a structural limitation on the terminal device 200. In some other embodiments, the terminal device 200 may alternatively use an interface connection manner different than the foregoing embodiment, or a combination of multiple interface connection manners.

The charging management module 240 is configured to receive a charging input from a charger. The charger may be a wireless charger, or may be a wired charger. When charging the battery 242, the charging management module 240 may further supply power to the electronic device by using a power management module 241.

The power management module 241 is configured to connect the battery 242, the charging management module 240, and the processor 210. The power management module 241 receives an input from the battery 242 and/or the charging management module 240, and supplies power to the processor 210, the internal memory 221, an external memory, the display 260, the camera 293, the wireless communication module 250, and the like. In some embodiments, the power management module 241 and the charging management module 240 may alternatively be disposed in a same component.

The wireless communication module 250 may provide a wireless communication solution that is applied to the terminal device 200 and that includes WLAN (such as Wi-Fi), bluetooth, a global navigation satellite system (global navigation satellite system, GNSS), frequency modulation (frequency modulation, FM), near field communication (near field communication. NFC), an infrared (infrared, IR) technology, and the like. For example, in this embodiment of this application, the terminal device 200 may establish a bluetooth connection to a terminal device (such as a wireless headset 100) through the wireless communication module 250.

The wireless communication module 250 may be one or more components integrating at least one communication processing module. The wireless communication module 250 receives an electromagnetic wave by using an antenna 2, performs frequency modulation and filtering processing on the electromagnetic wave signal, and transmits the processed signal to the processor 210. The wireless communication module 250 can further receive a to-be-sent signal from the processor 210 and perform frequency modulation and amplification on the signal, and then the antenna 2 converts the signal into an electromagnetic wave for radiation.

The terminal device 200 implements a display function by using a GPU, the display 260, an application processor, and the like. The GPU is a microprocessor used for image processing and is connected to the display 260 and the application processor. The GPU is configured to perform mathematical and geometric computation for graphic rendering. The processor 210 may include one or more GPUs, and the GPU executes a program instruction to generate or change display information.

The display 260 is configured to display an image, a video, and the like. The display 260 includes a display panel.

The external memory interface 220 may be configured to connect an external memory card, for example, a micro SD card, to expand a storage capacity of the terminal device 200. The external storage card communicates with the processor 210 by using the external memory interface 220 to implement a data storage function. For example, files such as music and videos are stored in the external memory card.

The internal memory 221 may be configured to store computer-executable program code, where the computer-executable program code includes instructions. The processor 210 executes various functional applications of the terminal device 200 and data processing by executing the instructions stored in the internal storage 221. For example, in this embodiment of this application, the processor 210 may execute the instructions stored in the internal memory 221. The internal memory 221 may include a program storage area and a data storage area.

The program storage area may store an operating system, an application program required by at least one function (for example, a sound play function or an image play function), and the like. The data storage area may store data (for example, audio data and address book) created during the use of the terminal device 200. In addition, the internal memory 221 may include a high-speed random access memory and may further include a non-volatile memory, for example, at least one magnetic disk storage device, a flash memory, or a universal flash storage universal flash storage, UFS).

FIG. 213 is a schematic structural diagram of a wearable device. As shown in FIG. 213, the wearable device may include a wireless communication module 310, a motion sensor 320, a processor 330, an internal memory 340, a power management module 350, a battery 360, a charging management module 370, and an antenna 3.

In some embodiments, the wireless communication module 310 may include an NFC chip. The NFC chip may include a device host (device host, DH and an NFC controller (NFC controller, NFCC). The DR may be responsible for NFCC management, such as initialization, configuration, and power management. The NFCC may be responsible for physical transmission of data through the antenna. In addition, the NFC chip can perform processing such as amplification, analog-to-digital conversion, digital-to-analog conversion, and storage of signals.

A wireless communication function of the wearable device may be implemented through the antenna 3, the wireless communication module 310, and the like.

In addition, the processor 330 may include one or more processing units. For example, the processor 330 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU).

In some embodiments, the processor 330 may include one or more interfaces. The interface may include an I2C interface, an I2S interface, a KM interface, a UART interface, an MIPI, a GPIO interface, a SIM card interface, and a. USB interface. It can be understood that an interface connection relationship between the modules shown in this embodiment is merely an example for description and does not constitute any limitation on the structure of the wearable device. In some other embodiments of this application, the wearable device may alternatively use an interface connection manner different from those in the foregoing embodiments or a combination of a plurality of interface connection manners.

The internal memory 340 may be configured to store one or more computer programs, and the one or more computer programs include instructions.

The motion sensor 320 may include an acceleration sensor, and a gyroscope. When the wearable device is a band or a watch, the band or the watch may perform detection of a card swiping motion based on the motion sensor 320.

It can be understood that the structure illustrated in this embodiment of this application does not constitute any specific limitation on the wearable device. In some other embodiments of this application, the wearable device may include components more or fewer than those shown in the figure, or combine some components, or split some components, or have different component arrangements. The components shown in the figure may be implemented in hardware, software, or a combination of software and hardware.

Figure 3:
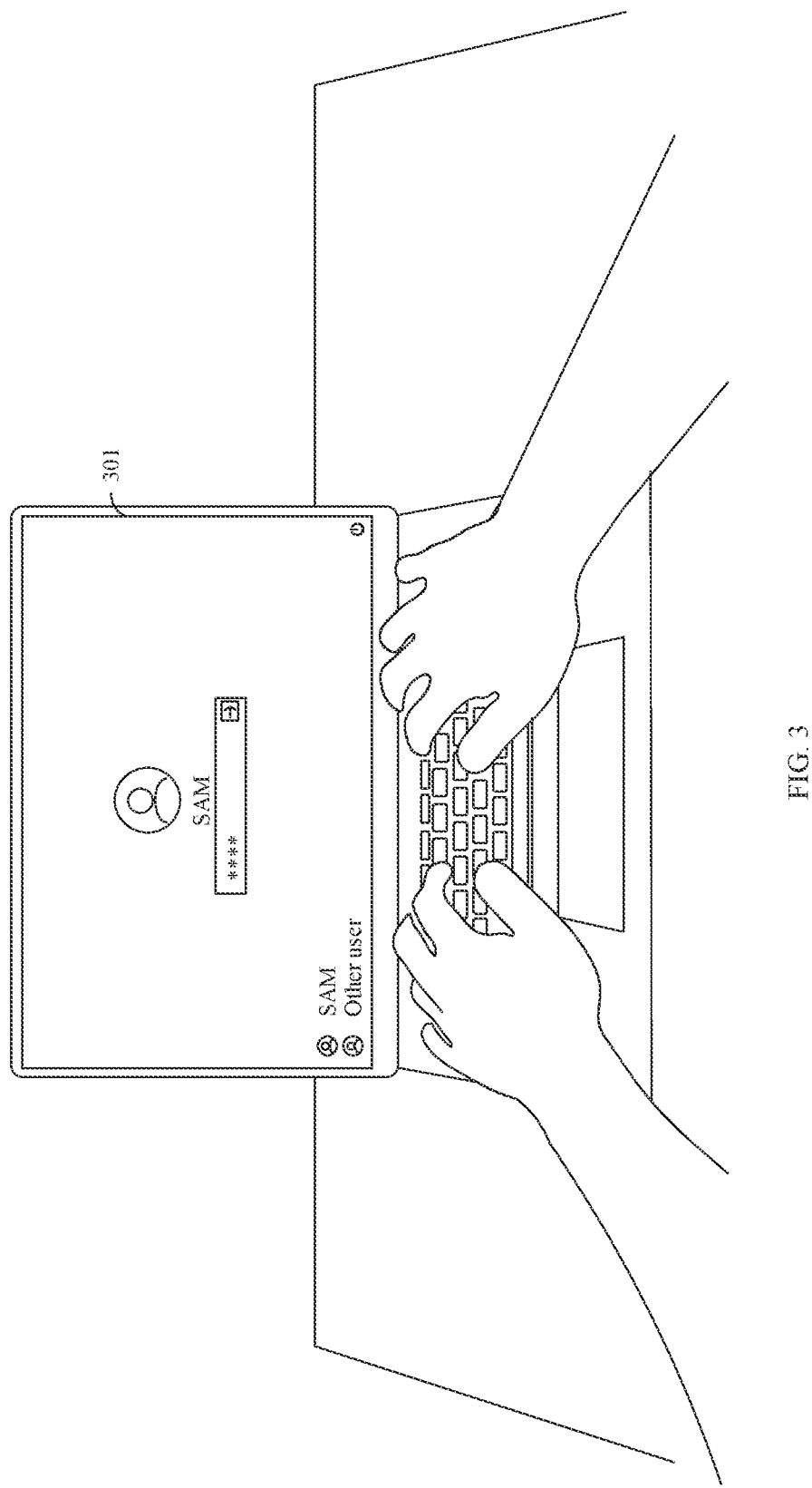
FIG. 3 is a schematic diagram of a scenario.

In the prior art, as shown in FIG. 3, when a computer is in a screen locked state, a user needs to input a correct password on an unlock screen 301 of the computer to unlock the computer. However, this unlock manner requires the user to input the password each time, which is cumbersome and affects user experience.

In view of this, the embodiments of this application provide a method for unlocking a terminal device by a wearable device, to authenticate an owner of the wearable device, perform detection on a motion of a user by using the wearable device, and complete an unlock operation on the terminal device when it is detected that the motion of the user is consistent with a preset unlock motion and the owner of the wearable device is authenticated successfully.

In this way, the user can unlock the terminal device merely through a motion without manually inputting a password, which is convenient and fast and improves user experience. In addition, the owner of the wearable device needs to be authenticated, and the unlock operation can be performed only when the authentication is successful. This can effectively avoid that an unrelated user unlocks the terminal device by using the wearable device, so that security of the terminal device is guaranteed.

An example in which the wearable device is a smart band and the terminal device is a personal computer is used in the following for describing a process of unlocking the personal computer by the smart band.

It should be noted that before the personal computer is unlocked by using the smart band, the smart band needs to be communicatively connected to the personal computer, and also needs to establish a binding relationship with the personal computer. The binding relationship may indicate that the smart band and the personal computer are bound by using a preset account name and a preset password. Establishing the binding relationship can help confirm that an owner of the smart band and an owner of the personal computer are the same person, thereby deter wining that the smart band has permission to perform an unlock operation on the personal computer.

Figure 4:
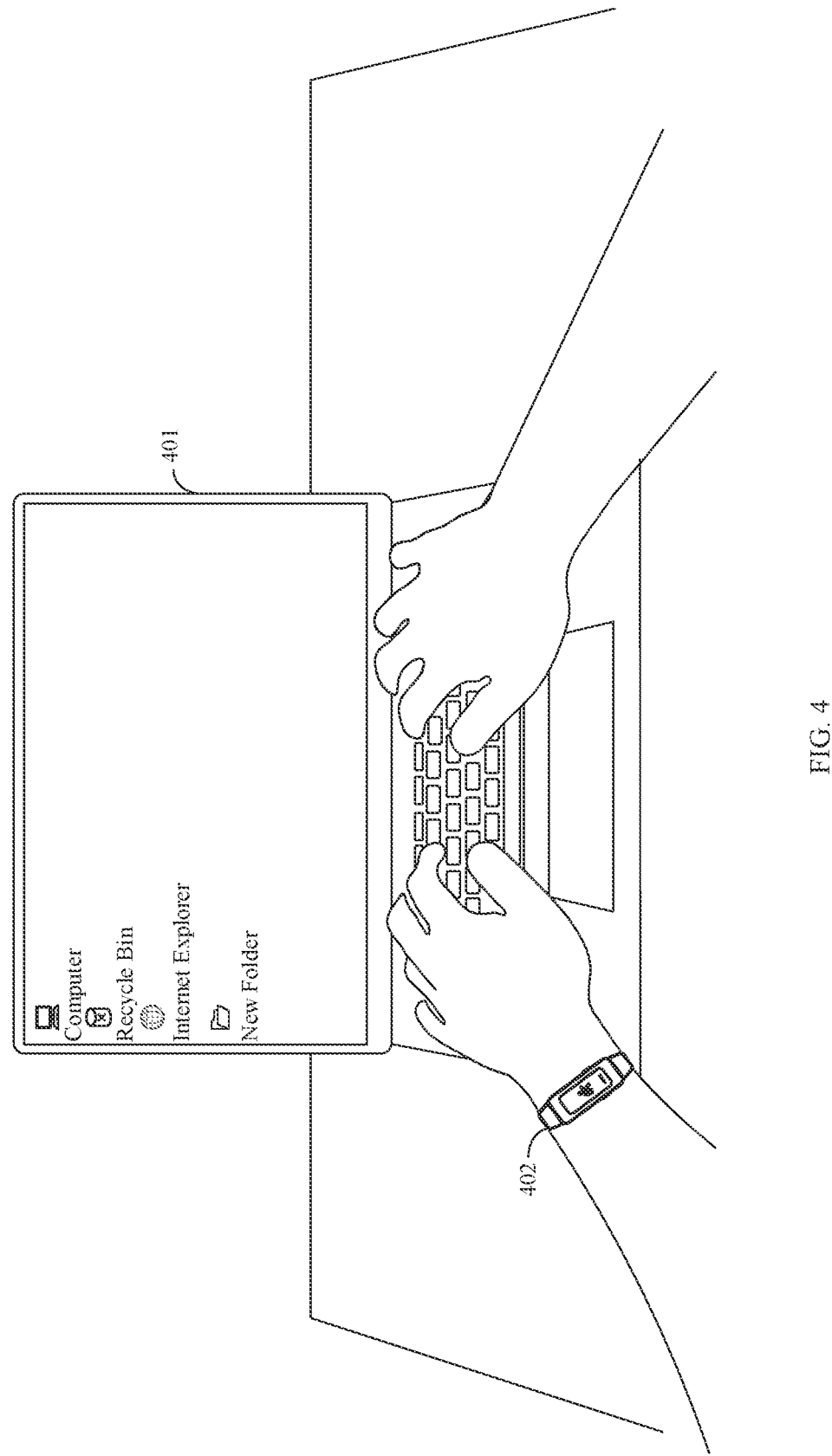
FIG. 4 is a schematic diagram of a scenario.
Figure 5A:
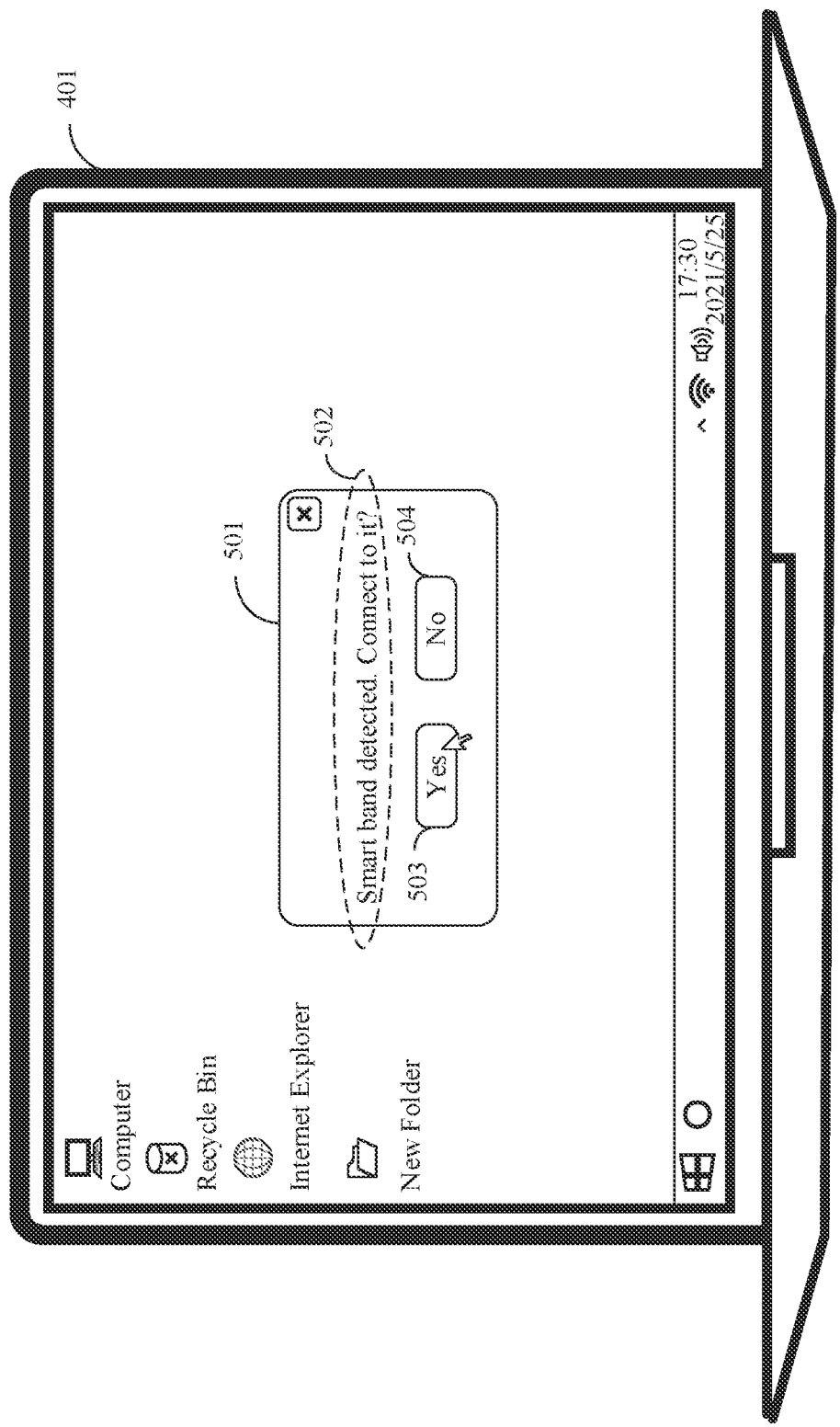
FIG. 5A is a screen diagram of a personal computer 401.

As shown in FIG. 4, a smart band 402 and a person computer 401 are not connected. Therefore, a communicative connection needs to be established between the smart band 402 and the personal computer 401. For example, a user may perform a first operation to cause the smart band 402 to establish a communicative connection to the personal computer 401. For example, the first operation may be an operation of the user carrying the smart band 402 approaching the personal computer 401. It may be understood that the smart band 402 and the personal computer 401 each are provided with an NFC chip. When a distance between the smart band 402 and the personal computer 401 is less than a preset connection distance, the personal computer 401 may display a connection prompt box 501 shown in FIG. 5A. For another example, the first operation may alternatively be an operation of enabling a bluetooth function of the smart band 402, where the smart band 402 and the personal computer 401 each are provided with a chip that can be used to implement bluetooth communication. The personal computer 401 may display the connection prompt box 501 shown in FIG. 5A after the smart band 401 is found through search. For another example, the first operation may alternatively be an operation of the user adding the smart band 402 to a local area network to which the personal computer 401 is connected. When detecting that the personal computer 401 and the smart band 402 join the same local area network, the personal computer 401 may display the connection prompt box 501 shown in FIG. 5A. In other words, the smart band 402 may communicate with the personal computer 401 through any one of Wi-Fi, bluetooth, or NFC.

The connection prompt box 501 may include prompt information 502, a "Yes" option 503, and a "No" option 504. The prompt information 502 is used to prompt the user that the personal computer 401 has detected a new smart band and ask the user whether to connect to the new smart band. For example, the prompt information 502 may be "Smart band detected. Connect to it?" The personal computer 401 may receive an operation of the user clicking the "Yes" option 503. In response to the operation, the personal computer 401 establishes a connection to the smart band 402. It can be understood that the connection may be any one of a Wi-Fi connection, a bluetooth connection, and an NFC connection. The personal computer 401 may receive an operation of the user clicking the "No" option 504. In response to the operation, the personal computer 401 does not proactively initiate a connection request to the smart band 402.

Figure 5B:
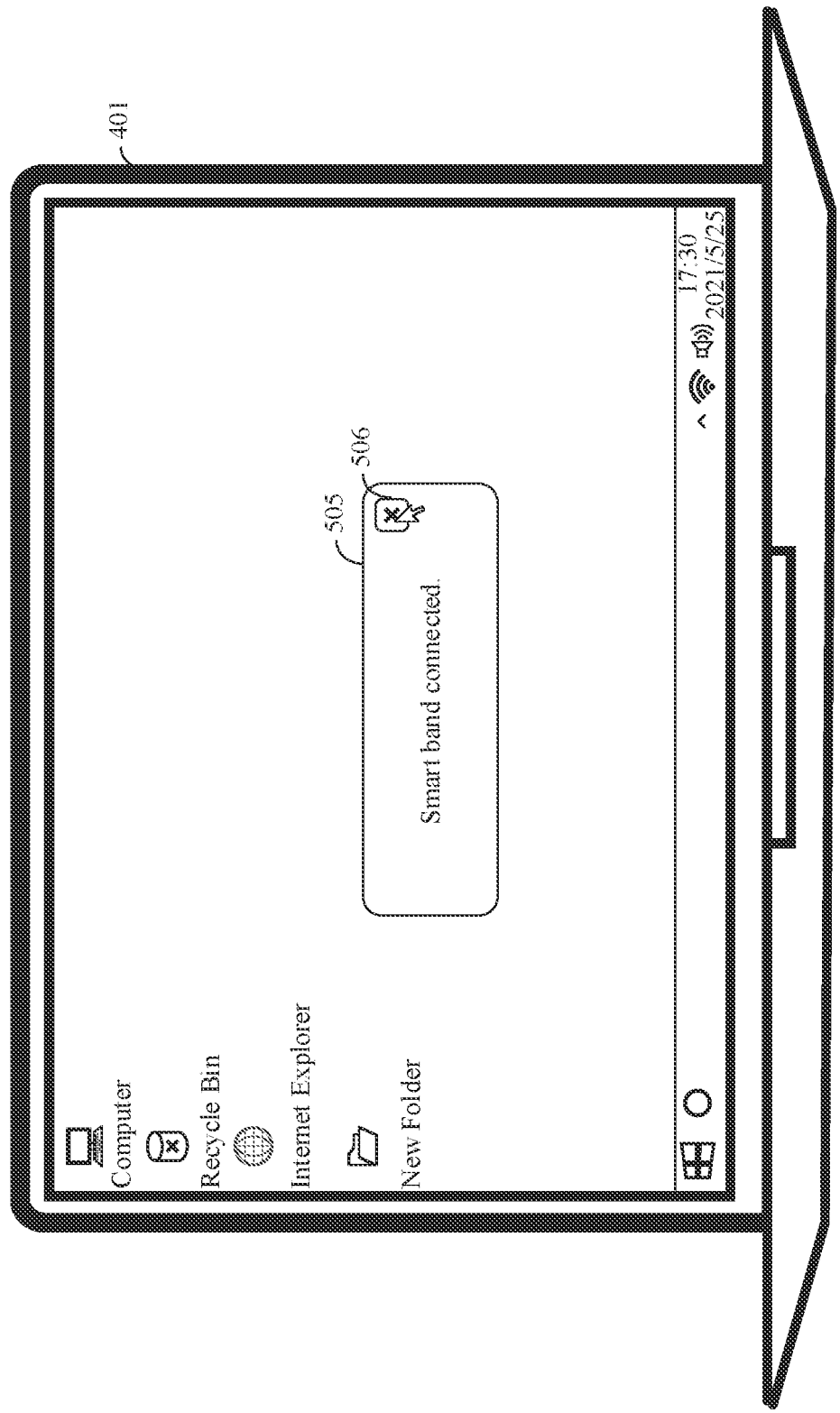
FIG. 5B is a screen diagram of a personal computer 401.

In a possible design, after establishing the connection to the smart band 402, the personal computer 401 may display a connection status prompt box 505 shown in FIG. 5B. The connection status prompt box 505 is used to notify the user that the personal computer 401 has been connected to the smart band 402. For example, the connection status prompt box 505 may display "Smart band connected." The connection status prompt box 505 may include a close option 506. The personal computer 401 may receive an operation of the user clicking the close option 506. In response to the operation, the personal computer 401 may close the connection status prompt box 505. In a possible design, if the personal computer 401 does not detect, within preset time, the operation of the user clicking the close option 506 in the connection status prompt box 505, the personal computer may automatically close the connection status prompt box 505.

Figure 6A:
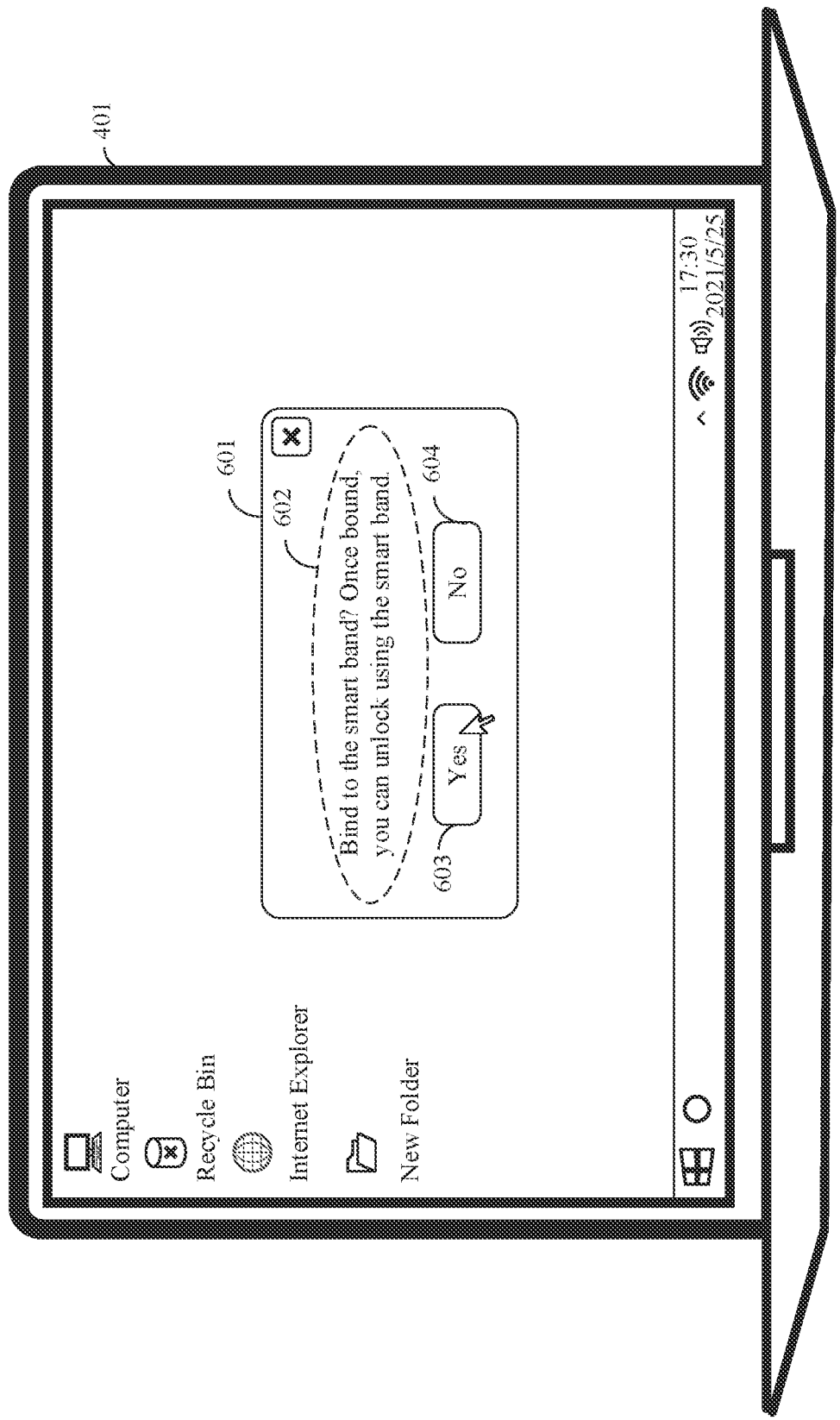
FIG. 6A is a screen diagram of a personal computer 401.
Figure 6B:
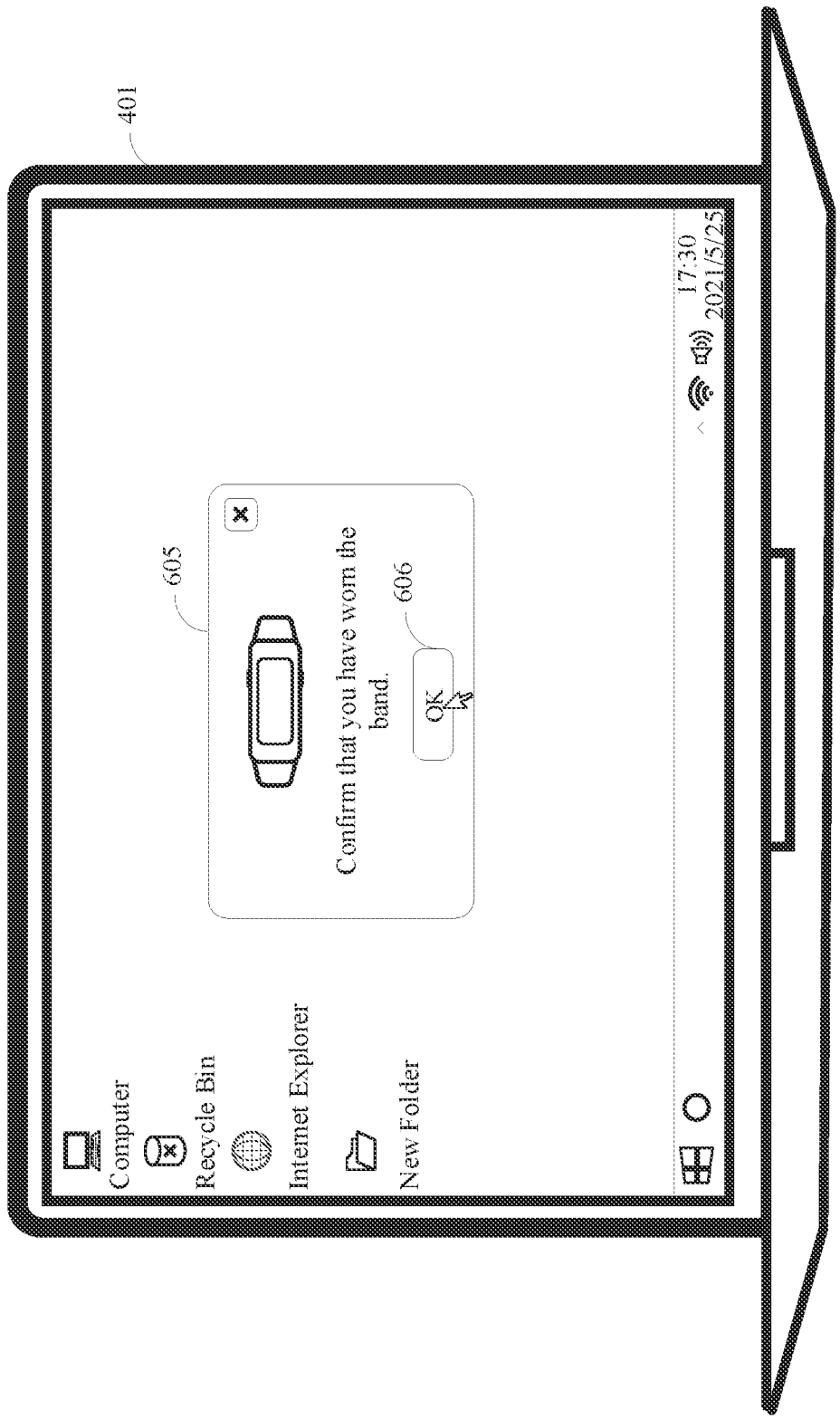
FIG. 6B is a screen diagram of a personal computer 401.

After the personal computer 401 establishes the connection to the smart band 402 the personal computer 401 may display a binding prompt box 601, as shown in FIG. 6A. The binding prompt box 601 may include prompt information 602, a "Yes" option 603, and a "No" option 604. The prompt information 602 is used to ask the user whether to hind the personal computer 401 and the smart band 402, and indicate that the smart band 402 has permission to perform an unlock operation on the personal computer 401 after the personal computer 401 and the smart band 402 are bound. For example, the prompt information 602 may be "Bind to the smart band? Once bound, you can unlock using the smart band." If the user does not want to bind the personal computer 401 and the smart band 402, the user may click the "No" option 604. The personal computer 401 may receive an operation of the user clicking the "No" option 604. In response to the operation, the personal computer 401 closes the binding prompt box 601 and ends the binding process. If the user agrees to bind the personal computer 401 and the smart hand 402, the user may click the "Yes" option 603. The personal computer 401 may receive an operation of the user clicking the "Yes" option 603. In response to the operation, the personal computer 401 may display a wearing confirmation prompt box 605, as shown in FIG. 6B. The wearing confirmation prompt box 605 is used to ask the user whether the user has worn the smart band 402. The smart band 402 may detect a wearing status. The wearing status is used to indicate whether the smart band 402 is worn by the user. In a possible design, a pressure sensor may be disposed in the smart band 402. The smart band 402 may confirm the wearing status of the smart band 402 based on data change of the pressure sensor. In addition, the smart band 402 may send wearing status information to the personal computer 401. After wearing the smart band 402, the user may click an "OK" option 606 in the wearing confirmation prompt box 605. The personal computer 401 may receive the operation of the user clicking the "OK" option 606. In response to the operation, the personal computer 401 may confirm that the smart band 402 is in the being-worn state or in a, not-being-worn state (non-wearing state) based on the received wearing status information. It can be understood that the personal computer 401 cannot confirm a user of the smart band 402 when the smart hand 402 is in the not-being-worn state. In this case, if the smart band 402 is bound to the personal computer 401, a user who originally does not know a password of the personal computer 401 can also unlock the personal computer 401 by using the smart band 402, Which has an adverse effect on data security of the personal computer 401. The personal computer 401 can confirm that a wearer of the smart band 402 is the user of the smart band 402 only when the smart band 402 is in the being-worn state. In this case, if the smart band 402 is bound to the personal computer 401 only the user wearing the smart band 402 can unlock the personal computer 401 by using the smart band 402, which ensures data security of the personal computer 401.

Figure 6C:
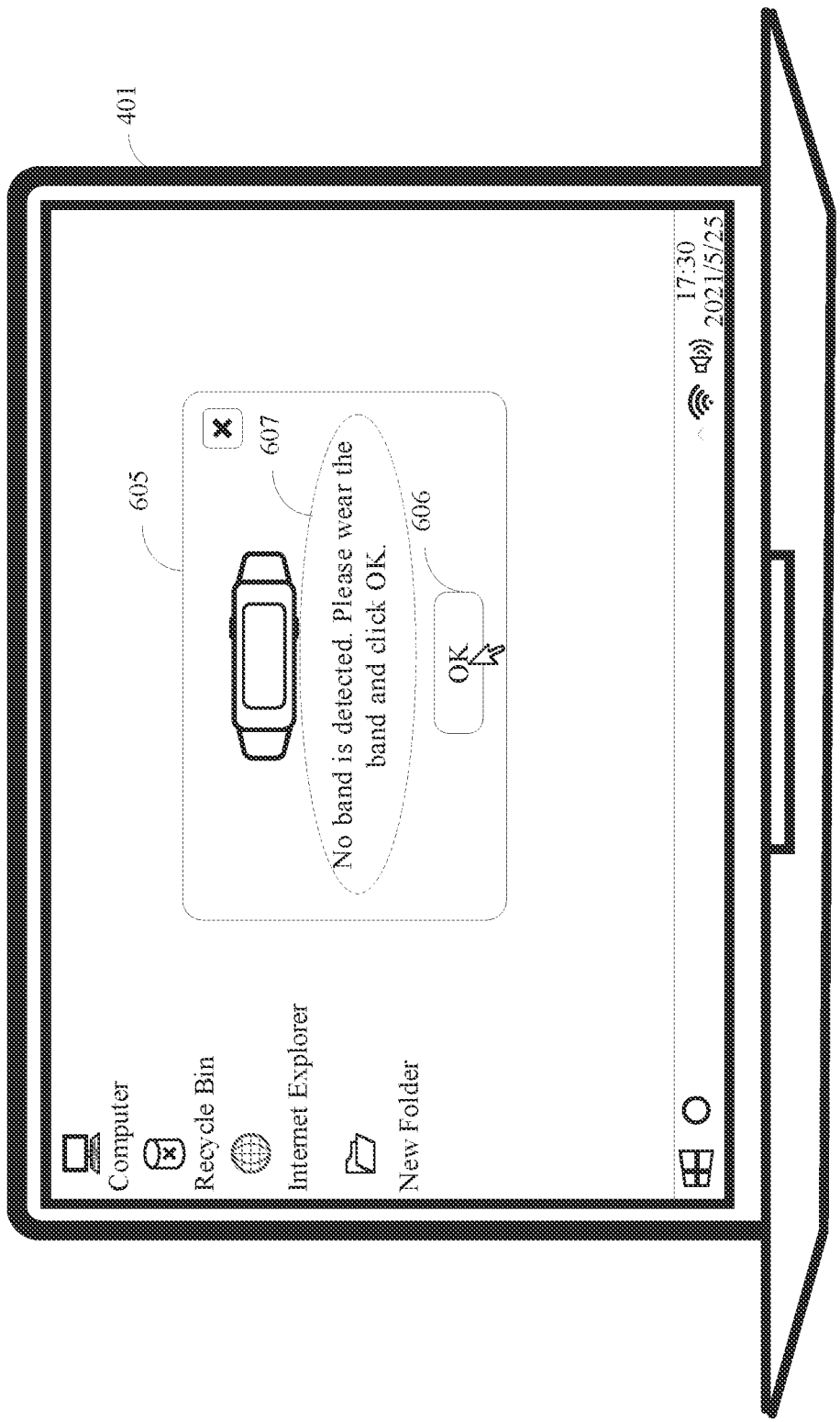
FIG. 6C is a screen diagram of a personal computer 401.
Figure 7A:
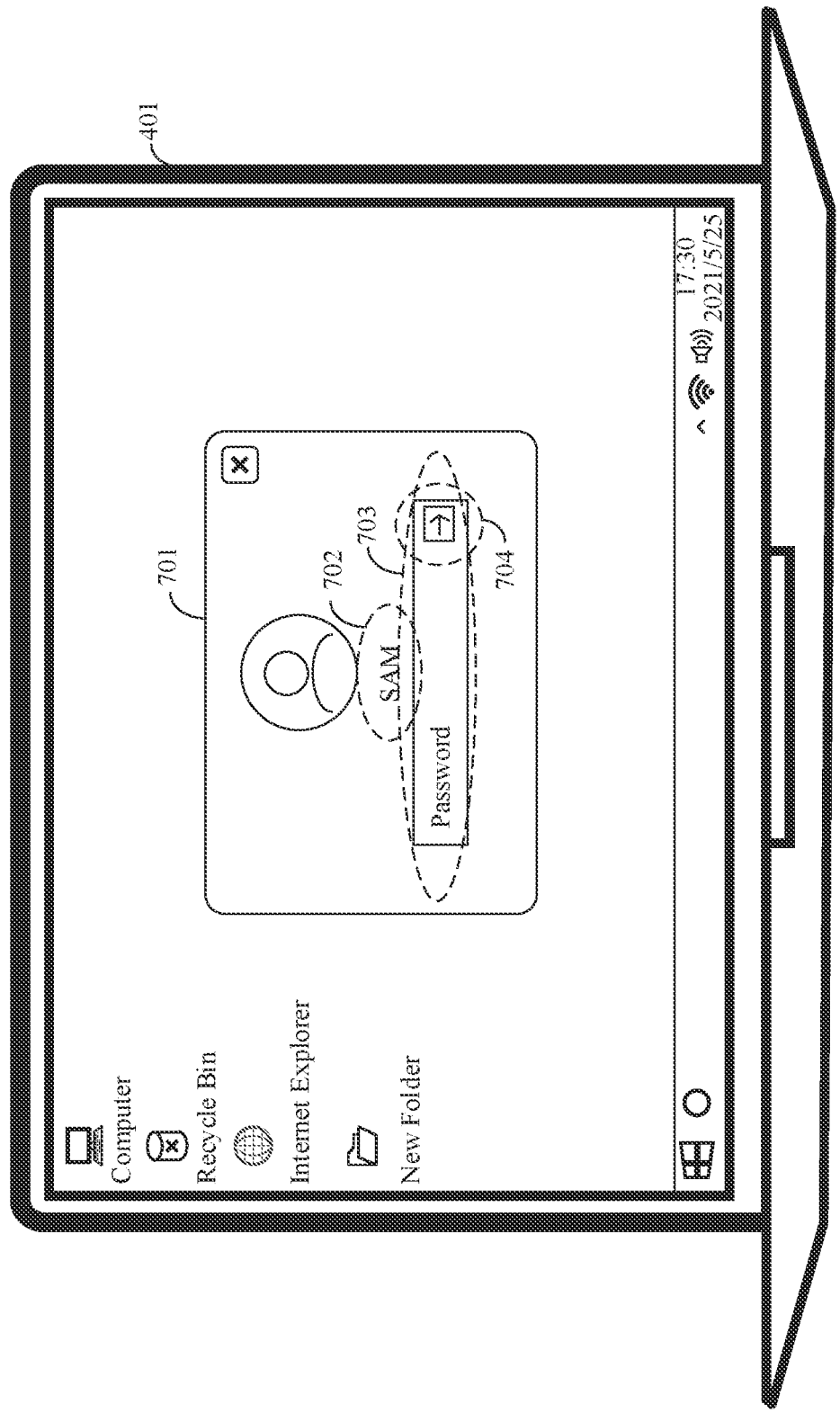
FIG. 7A is a screen diagram of a personal computer 401.

Therefore, if the wearing status information indicates that the smart band 402 is in the not-being-worn state, the personal computer 401 can confirm that the smart band 402 is in the not-being-worn state. The personal computer 401 displays prompt information 607 in the wearing confirmation prompt box 605, as shown in FIG. 6C. The prompt information 607 is used to notify the user that the user needs to wear the band again. For example, the prompt information 607 may be "No band is detected. Please wear the band and click OK." After wearing the smart band 402, the user may click the "OK" option 606 again. The personal computer 401 may receive the operation of the user clicking the "OK" option 606. In response to the operation, the personal computer 401 may confirm again that the smart band 402 is in the being-worn state or in the not-being-worn state based on information carrying a wearing status. If the wearing status information indicates that the smart band 402 is in the being-worn state, the personal computer 401 can confirm that the smart hand 402 is in the being-worn state. The personal computer 401 may display a password authentication box 701, as shown in FIG. 7A. An account name 702, a password input box 703, and an input option 704 may be displayed in the password authentication box 701. The account name 702 may be preset in the terminal device 701 by the user and may be, for example, a user name of a Windows system, such as SAM. The password input box 703 is used for the user to input a password. After inputting the password in the password input box 703, the user may click the input option 704 to indicate that password input is completed. Certainly, in another implementation, the user may alternatively use the Enter key on a physical/virtual keyboard to indicate that password input is completed. After receiving the password input by the user, the personal computer 401 needs to verify whether the password input by the user is consistent with a preset password, where the preset password is a password that matches the account name 702. For example, the account name 702 and the preset password may be an account name and a password of a startup screen or a lock screen on the personal computer 401. In other words, the personal computer 401 can be normally started up or unlocked only after the user inputs the correct account name and password. It can be understood that whether the wearer of the smart band 402 has permission to unlock the personal computer 401 can be identified by verifying whether the password input by the user is consistent with the preset password. When the password input by the user is consistent with the preset password, it can be considered that the wearer of the smart band 402 and an owner of the personal computer 401 are the same person, or that the wearer of the smart band 402 has the permission to unlock the personal computer 401. Conversely, when the password input by the user is inconsistent with the preset password, it is considered that an owner of the smart band 402 does not have the permission to unlock the personal computer 401.

Figure 7B:
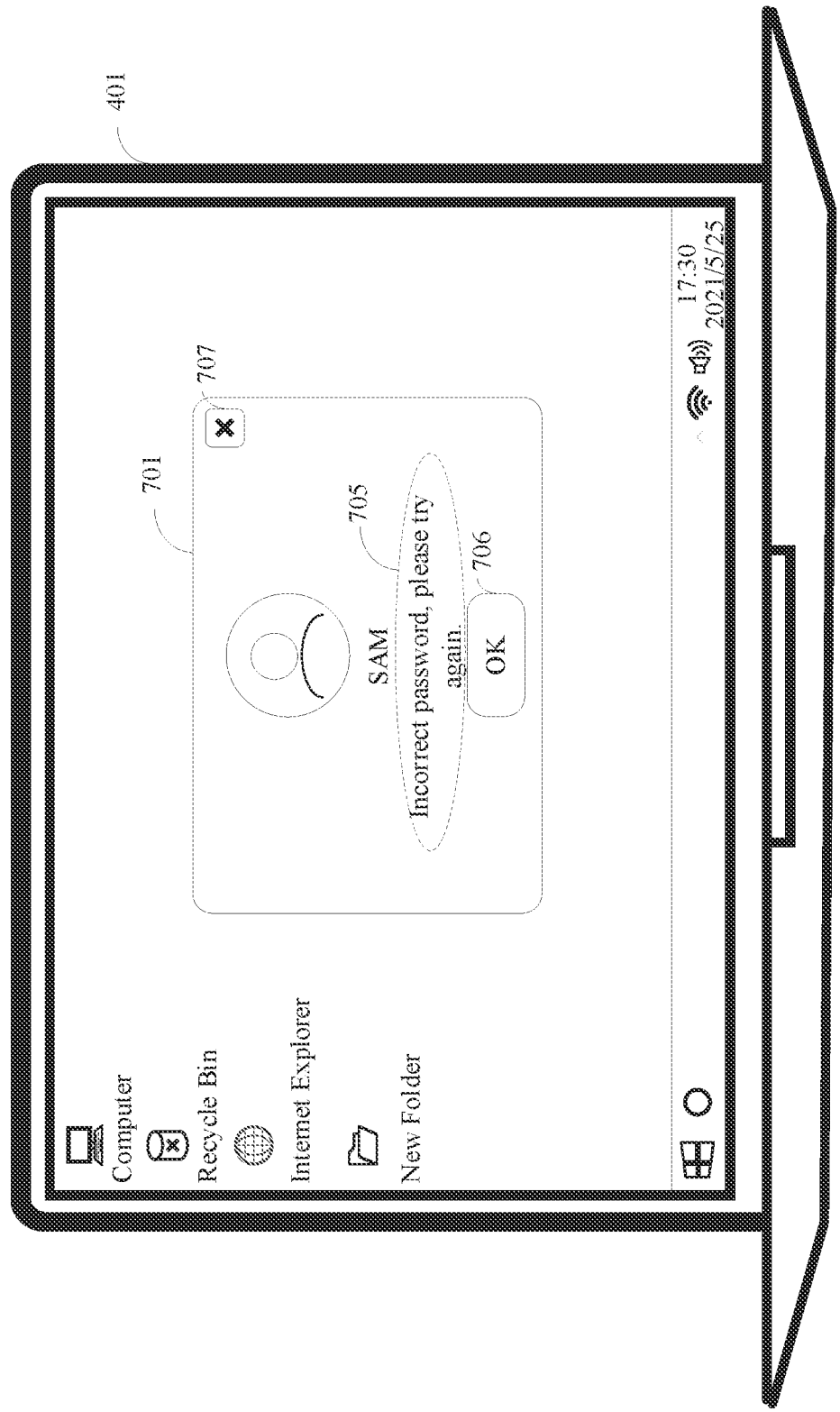
FIG. 7B is a screen diagram of a personal computer 401.

Therefore, if an authentication result is that the password input by the user is inconsistent with the preset password, the personal computer 401 may display prompt information 705 in the password authentication box 701, as shown in FIG. 7B. The prompt information 705 is used to prompt the user that the input password is incorrect. For example, the prompt information 705 may be "Incorrect password, please try again." In addition, the password authentication box 701 further includes an "OK" option 706 and a close option 707. If the user needs to re-enter a password, the user may click the "OK" option 706. The personal computer 401 may receive the operation of the user clicking the "OK" option 706, In response to the operation, the personal computer 401 may display again the password authentication box 701 shown in FIG. 7A for the user to re-enter a password. If the user does not need to re-enter a password, the user may click the close option 707. The personal computer 401 may receive the operation of the user clicking the close option 707. In response to the operation, the personal computer 401 may close the password authentication box 701.

Figure 8A:
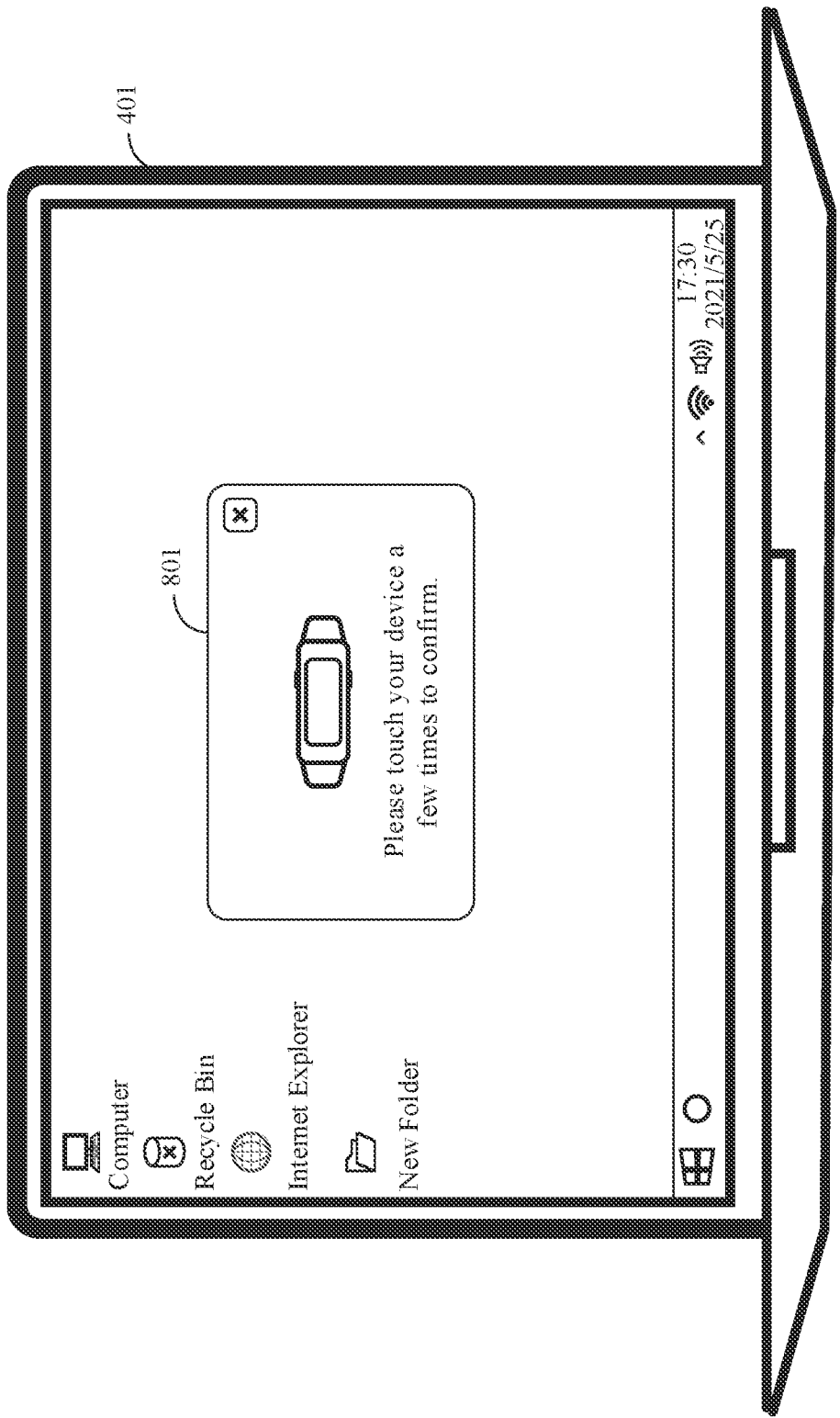
FIG. 8A is a screen diagram of a personal computer 401.
Figure 8B:
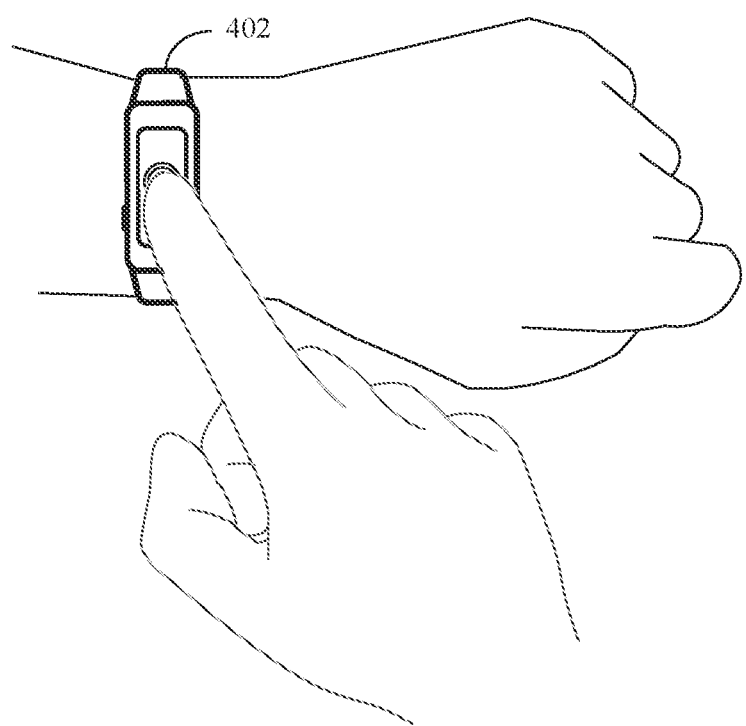
FIG. 8B is a screen diagram of a personal computer 401.

If an authentication result is that the password input by the user is consistent with the preset password, the personal computer 401 may initiate a binding confirmation request to the smart band 402. In an optional implementation, the personal computer 401 may display a confirm prompt box 801, as shown in FIG. 8A. The confirm prompt box 801 is used to prompt the user to perform a confirm operation in the smart band 402. The confirm operation is used for confirming that a binding relationship can be established between the smart band 402 and the personal computer 401. For example, the confirm prompt box 801 may display "Please touch your device a few times to confirm." Therefore, as shown in FIG. 8B, the user may touch a display of the smart hand 402 to complete the confirm operation. The smart band 402 may receive the operation of the user touching the display. In response to the operation, the smart band 402 may generate confirmation information and feed back the confirmation information to the personal computer 401. In this way, the smart band 402 establishes the binding relationship with the personal computer 401. It can be understood that the process in which the smart band 402 establishes the binding relationship with the personal computer 401 is equivalent to a process of verifying whether the wearer of the smart band 402 has the permission to unlock the personal computer 401. After the smart band 402 establishes the binding relationship with the personal computer 401, it can be considered that the wearer of the smart band 402 is authenticated successfully.

Figure 9:
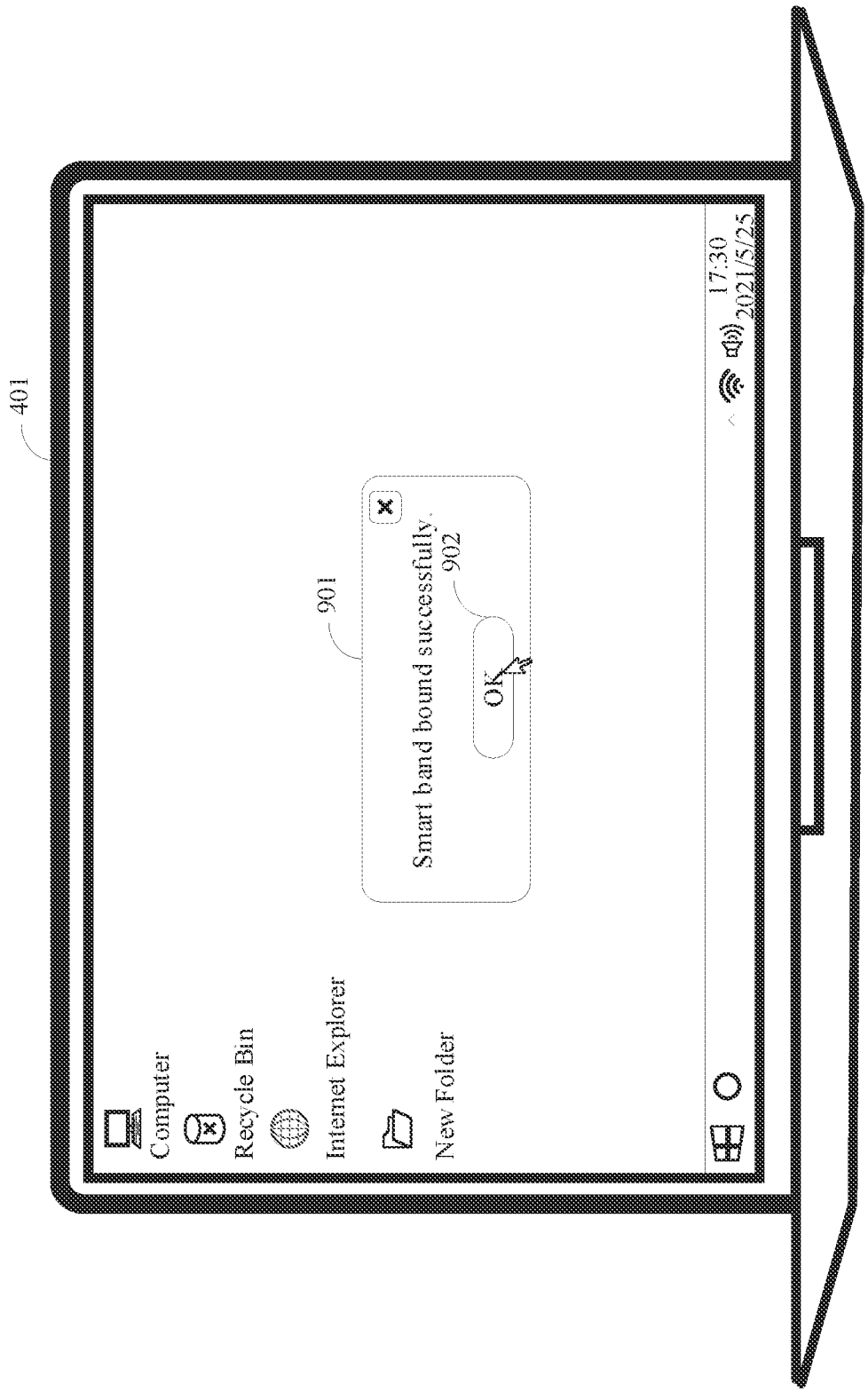
FIG. 9 is a screen diagram of a personal computer 401.
Figure 10:
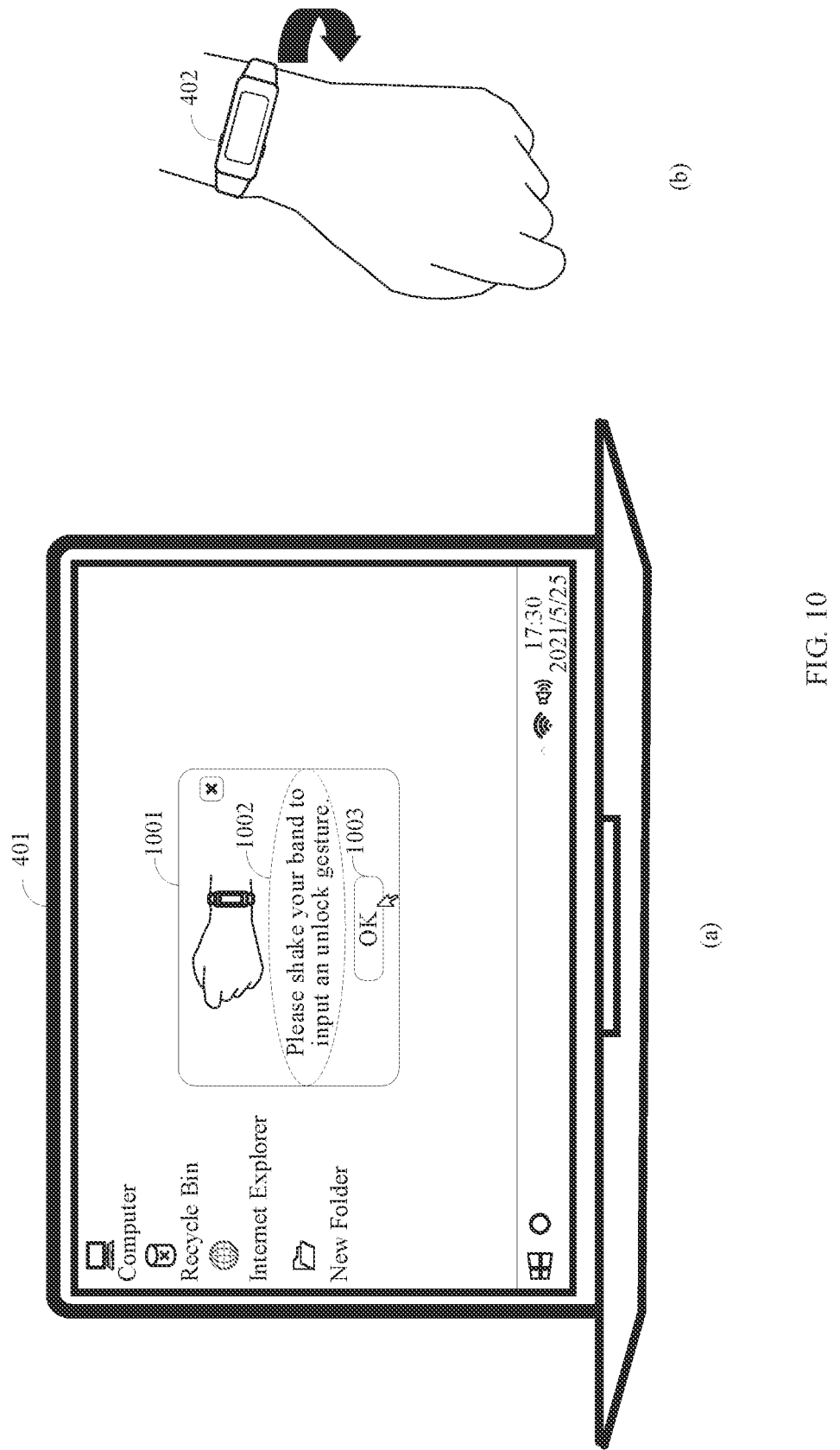
FIG. 10 is a screen diagram of a personal computer 401.

In an optional implementation, after the personal computer 401 authenticates the smart band 402, the personal computer 401 may display a binding confirmation prompt box 901, as shown in FIG. 9. The binding confirmation prompt box 901 is used to remind the user that the personal computer 401 has been bound to the smart band 402. For example, the binding confirmation prompt box 901 may display "Smart band bound successfully." In addition, the binding confirmation prompt box 901 may further include an "OK" option 902. The personal computer 401 may receive an operation performed by the user on the "OK." option 902. In response to the operation, the personal computer 401 may display an unlock gesture prompt box 1001 shown in FIG. 10(*a*). The unlock gesture prompt box 1001 includes prompt information 1002 and an "OK" option 1003. The prompt information 1002 is used to remind the user to input an unlock gesture. For example, the prompt information 1002 may be "Please shake your band to input an unlock gesture" or an animation prompting the user to shake the band. As shown in FIG. 10(*b*), the user may shake the band to input an unlock gesture. For example, the unlock gesture may be any gesture such as drawing a circle (drawing a circle clockwise or drawing a circle counterclockwise) or drawing a shape such as "Z", "M", or "N" with the smart band 402. The smart band 402 can detect a motion track of the smart band 402 by using a motion sensor of the smart band 402, generate gesture information (motion data) that matches the motion track, and transmit the gesture information to the personal computer 401. After shaking the smart band 402, the user may click the "OK" option 1003, The personal computer 401 may receive the operation of the user clicking the "OK" option 1003, in response to the operation, the personal computer 401 may determine whether the personal computer 401 has received the gesture information.

Figure 11A:
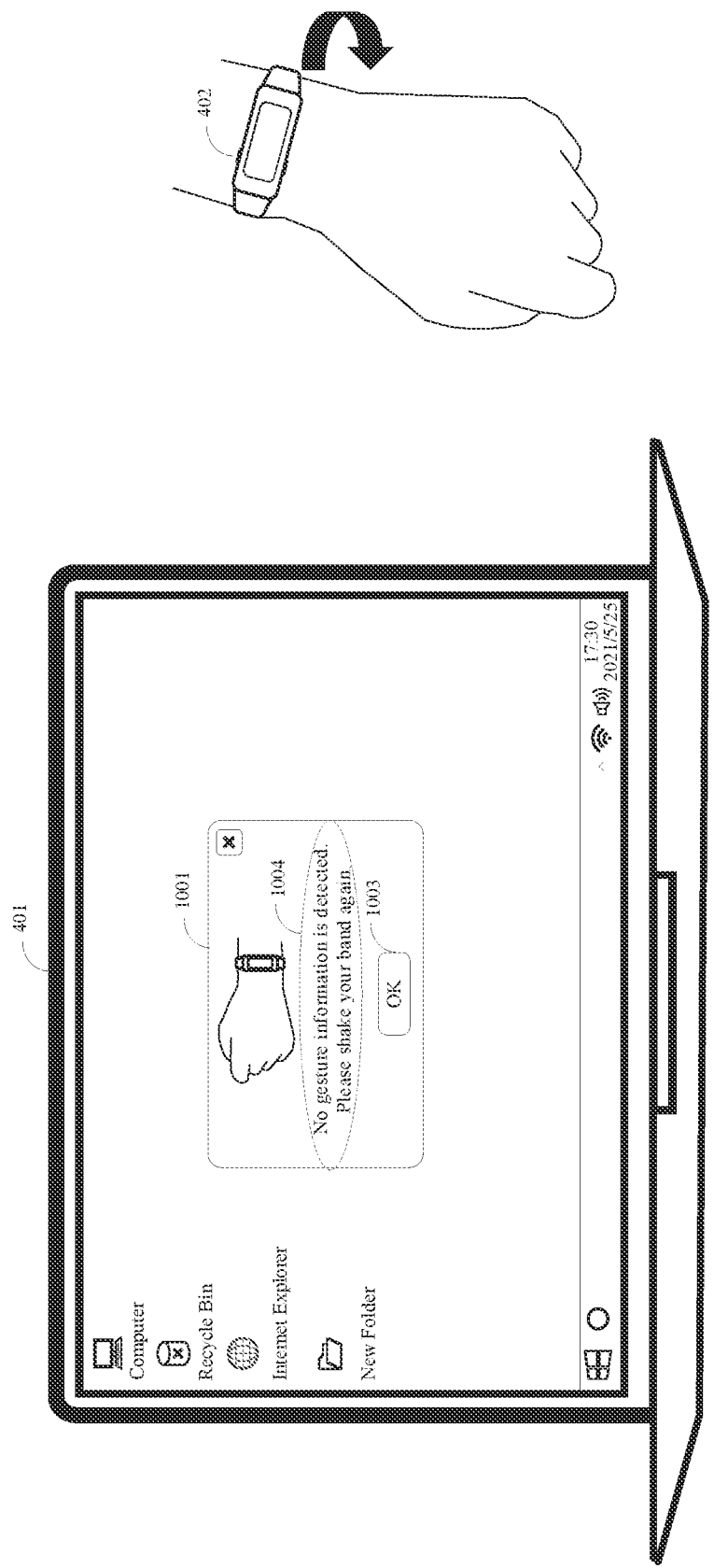
FIG. 11A is a screen diagram of a personal computer 401.
Figure 11B:
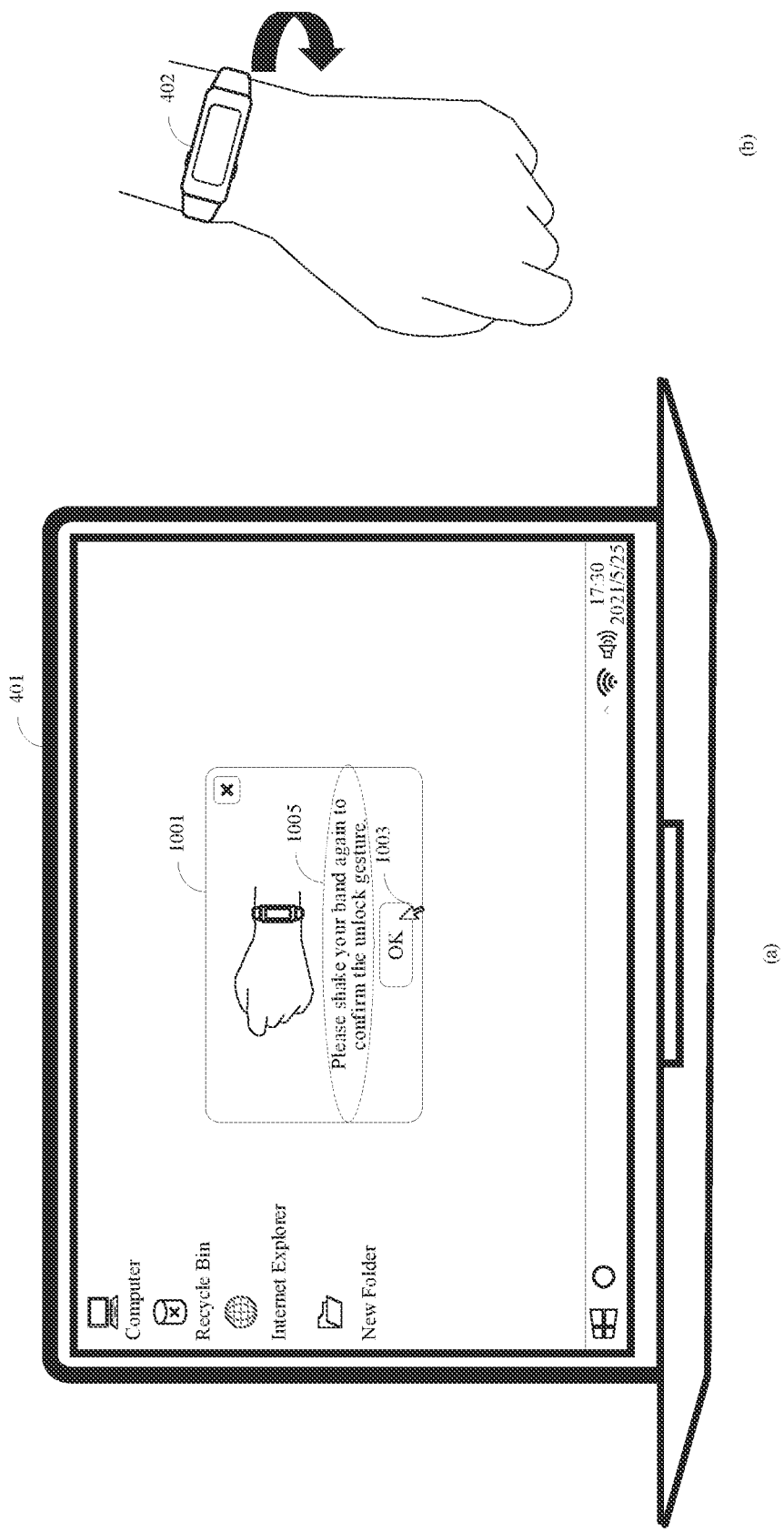
FIG. 11B is a screen diagram of a personal computer 401.

If the personal computer 401 receives no gesture information, the personal computer 401 may display prompt information 1004 in the unlock gesture prompt box 1001, as shown in 11A(a). The prompt information 1004 is used to prompt the user that no gesture information is detected by the personal computer 401, and the user needs to shake the band again. In this case, as shown in FIG. 11A(b), the user may shake the smart band 402 again, input the unlock gesture, and click the "OK" option 1003. The personal computer 401 may receive the operation of the user clicking the "OK" option 1003. In response to the operation, the personal computer 401 may determine again whether the personal computer 401 has received the gesture information input by the user. If the personal computer 401 has received the gesture information, the personal computer 401 may display prompt information 1005 in the unlock gesture prompt box 1001, as shown in FIG. 11B(a), The prompt information 1005 is used to prompt the user that the personal computer 401 has detected the gesture information, and the user needs to confirm the gesture information. For example, the prompt information 1005 may be "Please shake your band again to confirm the unlock gesture." As shown in FIG. 11B(b), the user may shake the smart band 402 again according to the last motion track (for example, in a clockwise direction in FIG. 10 or FIG. 11A) and click the "OK" option 1003 again. After receiving the gesture information again, the personal computer 401 may determine whether the gesture information received twice is consistent. It can be understood that by determining whether the gesture information received twice is consistent, the personal computer 401 can ensure that the gesture information input by the user is indeed gesture information conceived by the user, thereby avoiding that an incorrect unlock gesture is set because of an error motion of the user. Certainly, in another implementation, after receiving gesture information for the first time, the personal computer 401 may alternatively directly set the gesture information as gesture information that can be used for performing an unlock operation.

Figure 12A:
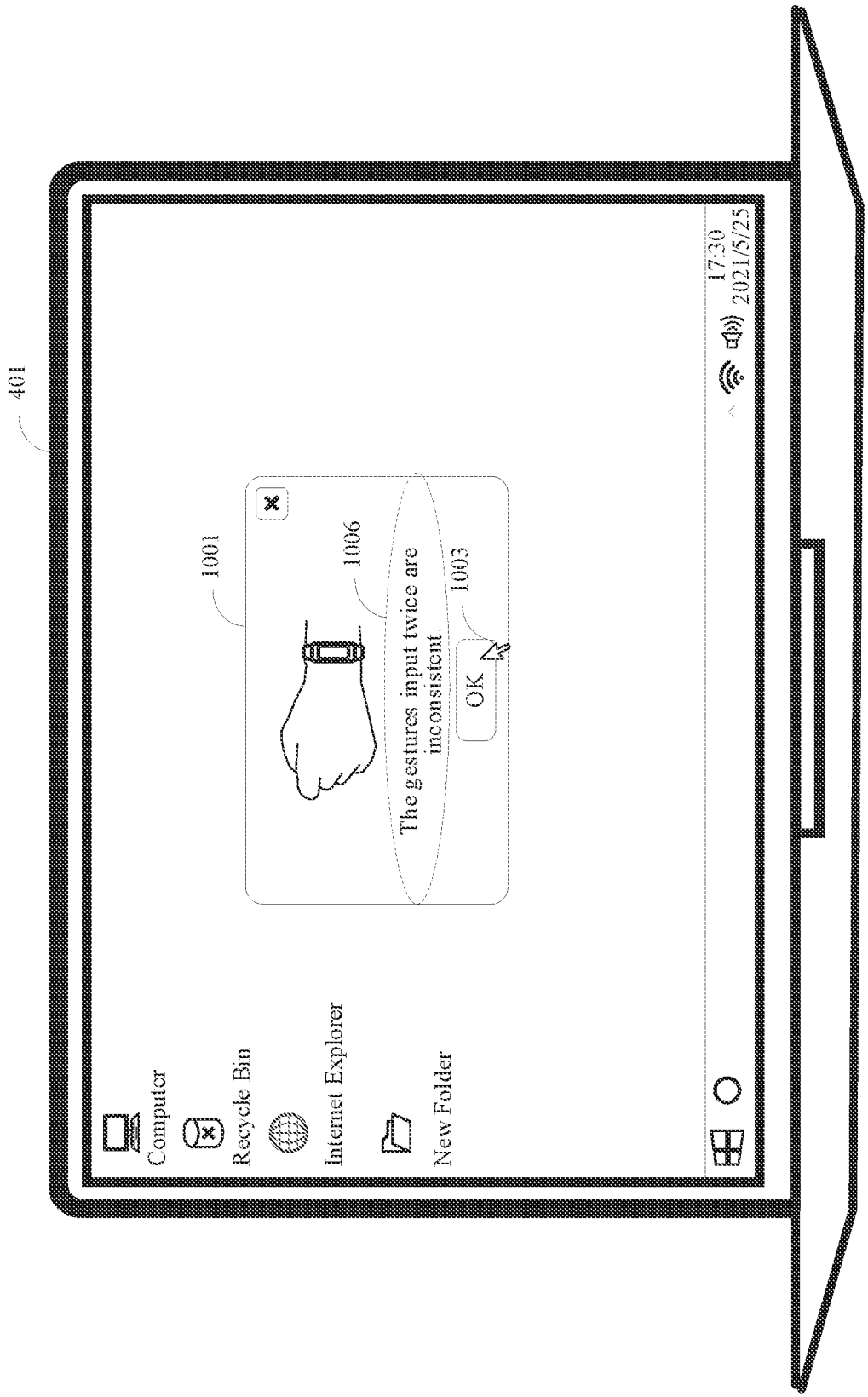
FIG. 12A is a screen diagram of a personal computer 401.
Figure 12B:
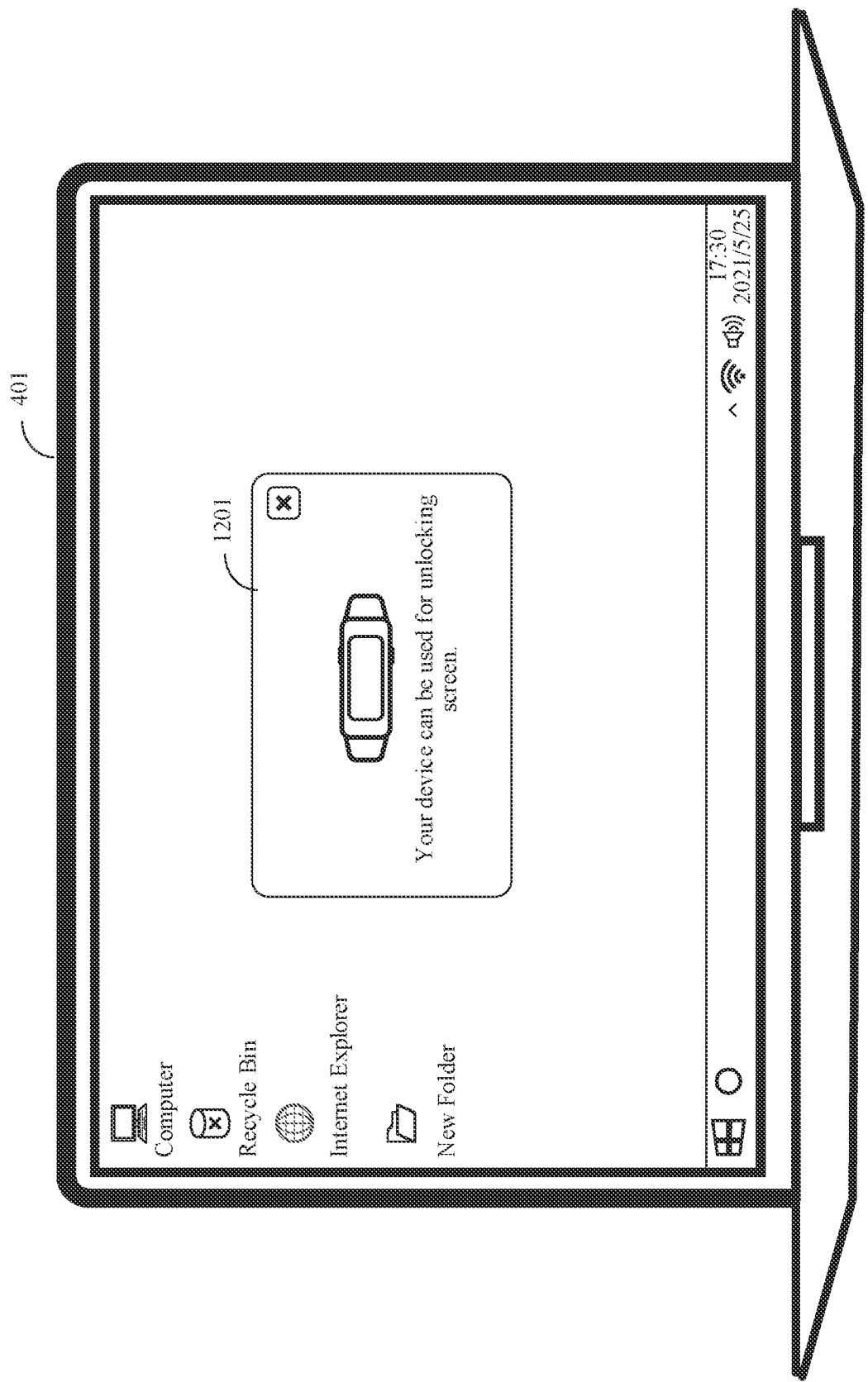
FIG. 12B is a screen diagram of a personal computer 401.

If the personal computer 401 determines that the gesture information received twice is inconsistent, the personal computer 401 may display prompt information 1006, as shown in FIG. 12A. The prompt information 1006 is used to prompt the user that the gesture information input twice is inconsistent and prompt the user to confirm the gesture information. The personal computer 401 may receive the operation performed by the user on the "OK" option 1003. In response to the operation, the personal computer 401 may display again the binding confirmation prompt box 901 shown in FIG. 10(*a*) to prompt the user to perform again the process of inputting an unlock gesture. If the personal computer 401 determines that the gesture information received twice is consistent, the personal computer 401 may display a function prompt box 1201, as shown in FIG. 1213, The function prompt box 1201 is used to prompt the user that the smart band 401 can be used to perform an unlock operation on the personal computer 401. It should be noted that after the personal computer 401 establishes the binding relationship with the smart band 402, both the personal computer 401 and the smart band 402 can store the gesture information input by the user.

Figure 13A:
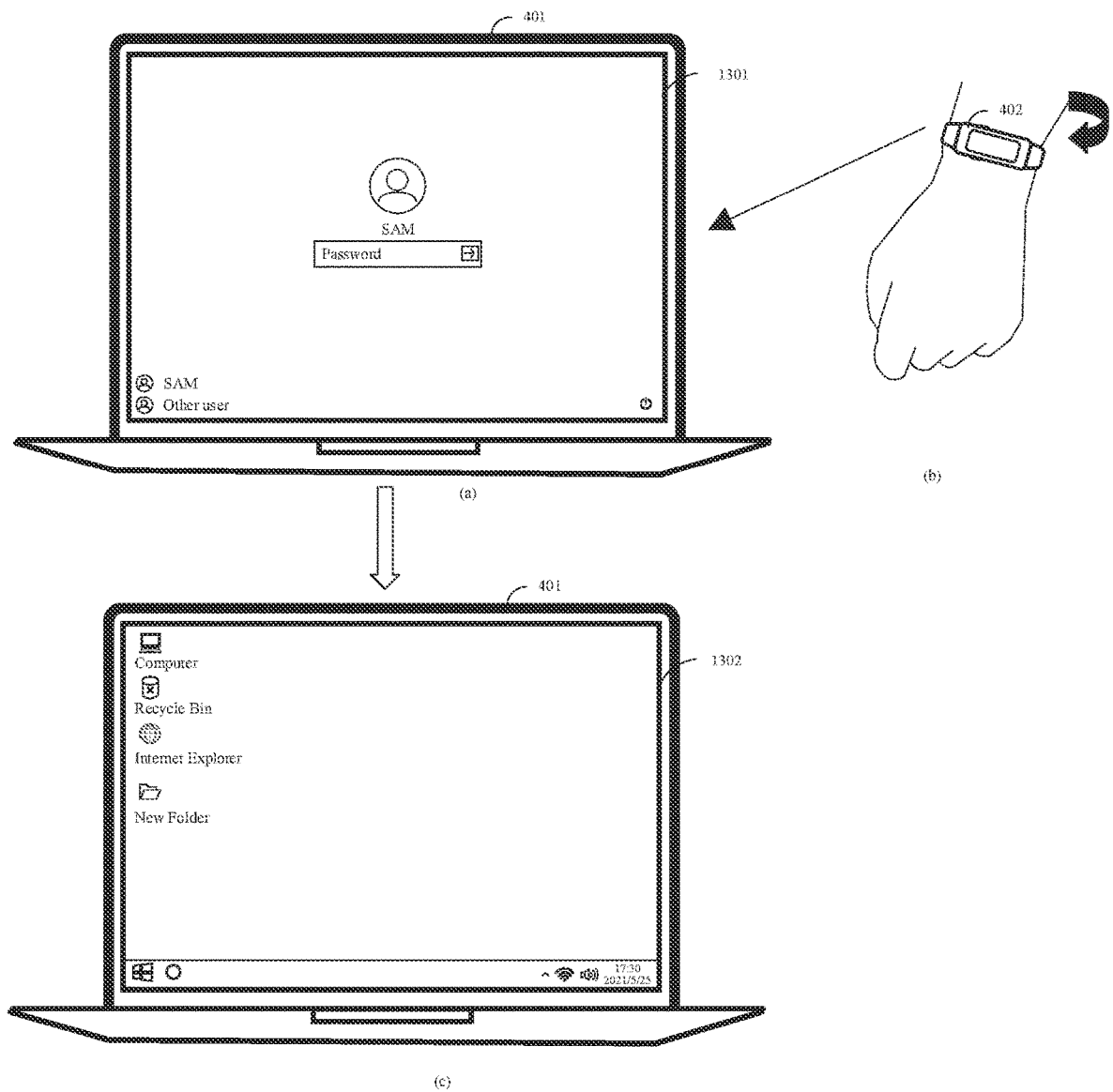
FIG. 13A is a schematic diagram of unlocking a personal computer 401 by a smart band.
Figure 13B:
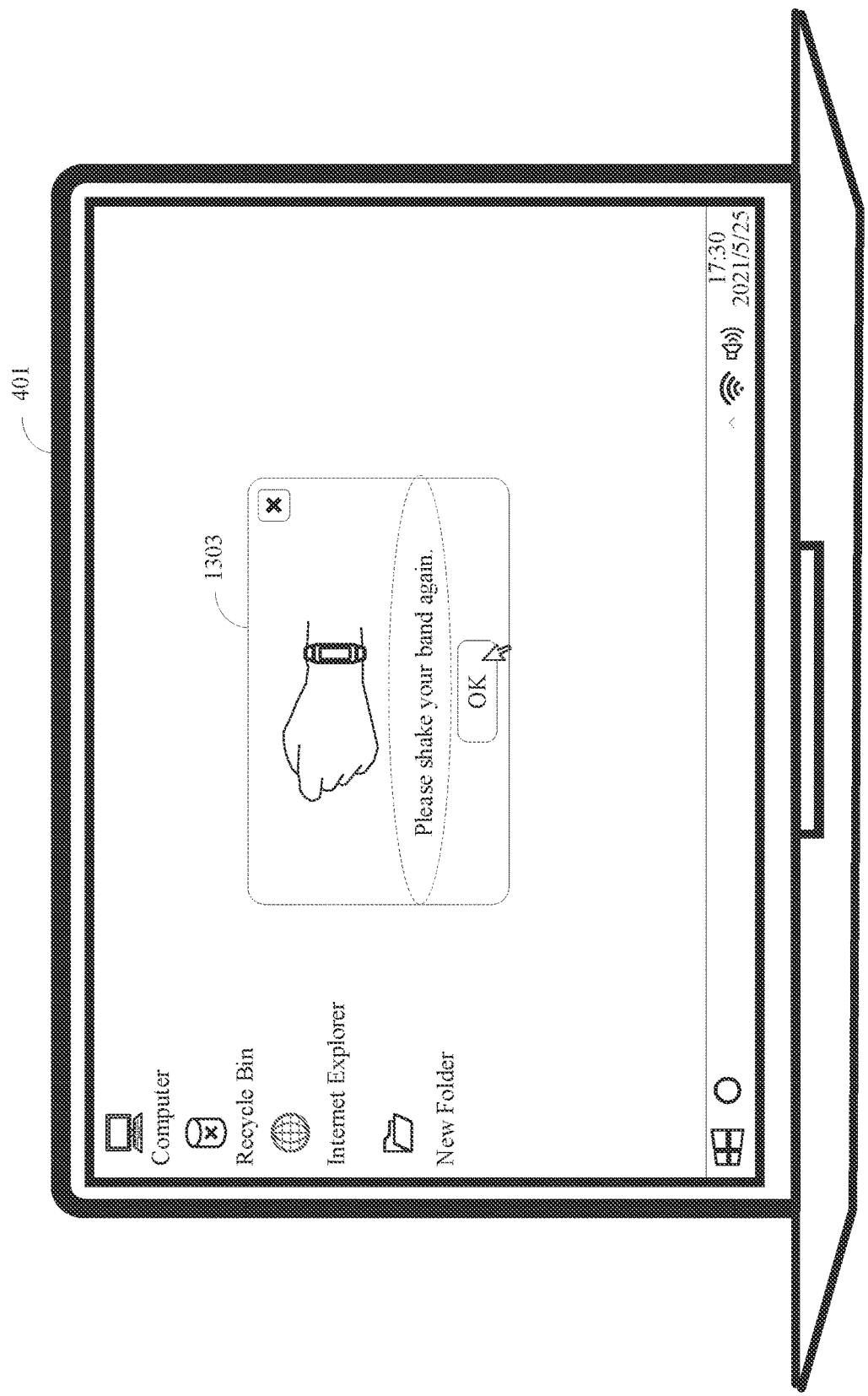
FIG. 13B is a screen diagram of a personal computer 401.

After the personal computer 401 establishes the binding relationship with the smart band 402, the user can unlock the personal computer 401 by using the smart band 402. As shown in FIG. 13A(a), the personal computer 401 may display an unlock screen 1301. The unlock screen 1301 is used to prompt the user to input a password. If the user needs to unlock the personal computer 401, the user may shake the smart band 402 according to a preset gesture (for example, shaking the smart band 402 in a clockwise direction), as shown in FIG. 13A(b). After detecting the user's motion of shaking the smart band 402, the smart band 402 may generate gesture information that matches a motion track of the smart band 402. In an optional implementation, the smart band 402 may compare the generated gesture information with preset gesture information and determine whether the smart band 402 has ever been taken off from the user's wrist. If the smart band 402 determines that the generated gesture information is consistent with the preset gesture information and that the smart band 402 has not been taken off from the user's wrist, the smart band 402 generates an unlock request and sends the unlock request to the personal computer 401, The personal computer 401 may receive the unlock request sent by the smart band 402. In response to the request, the personal computer 401 performs an unlock operation and displays a desktop 1302, as shown in FIG. 13A(c).

In another optional implementation, the smart band 402 may send the generated gesture information to the personal computer 401. The personal computer 401 compares the gesture information with preset gesture information and determines whether the smart band 402 has ever been taken off from the user's wrist. If the smart band 402 determines that the gesture information input by the user is consistent with the preset gesture information and that the smart band 402 has not been taken off from the user's wrist, the personal computer 401 performs an unlock operation and displays a desktop 1302, as shown in FIG. 13A(c).

In a possible design, after receiving the gesture information sent by the smart band 402, the personal computer 401 may display a prompt box 1303 shown in FIG. 1313. The prompt box 1303 is used to prompt the user to shake the band 402 again. After detecting the user's motion of shaking the smart band 402 again, the smart band 402 may generate gesture information that matches a motion track of the smart band 402 and send the generated gesture information to the personal computer 401 again. When determining that the gesture information received twice is consistent and that the smart band 402 has not been taken off from the user's wrist, the personal computer 402 may perform an unlock operation and display the desktop 1302 shown in FIG. 13A(c).

It can be understood that by determining whether the smart band 402 has ever been taken off from the user's wrist, it can be determined whether the wearer of the smart band 402 is changed. If information carrying a wearing status indicates that a wearing status of the smart band 402 has not been changed, it can be confirmed that the smart band 402 has not been taken off from the user's wrist, and therefore it is considered that the wearer of the smart band 402 is not changed. The smart band 402 has the permission to perform an unlock operation on the personal computer 401. If the information carrying a wearing status indicates that the wearing status of the smart band 402 has been changed, it can be considered that the smart band 402 has ever been taken off from the user's wrist, and therefore it is considered that the owner of the smart band 402 may be changed, and the owner of the smart band 402 needs to be authenticated again.

Figure 14A:
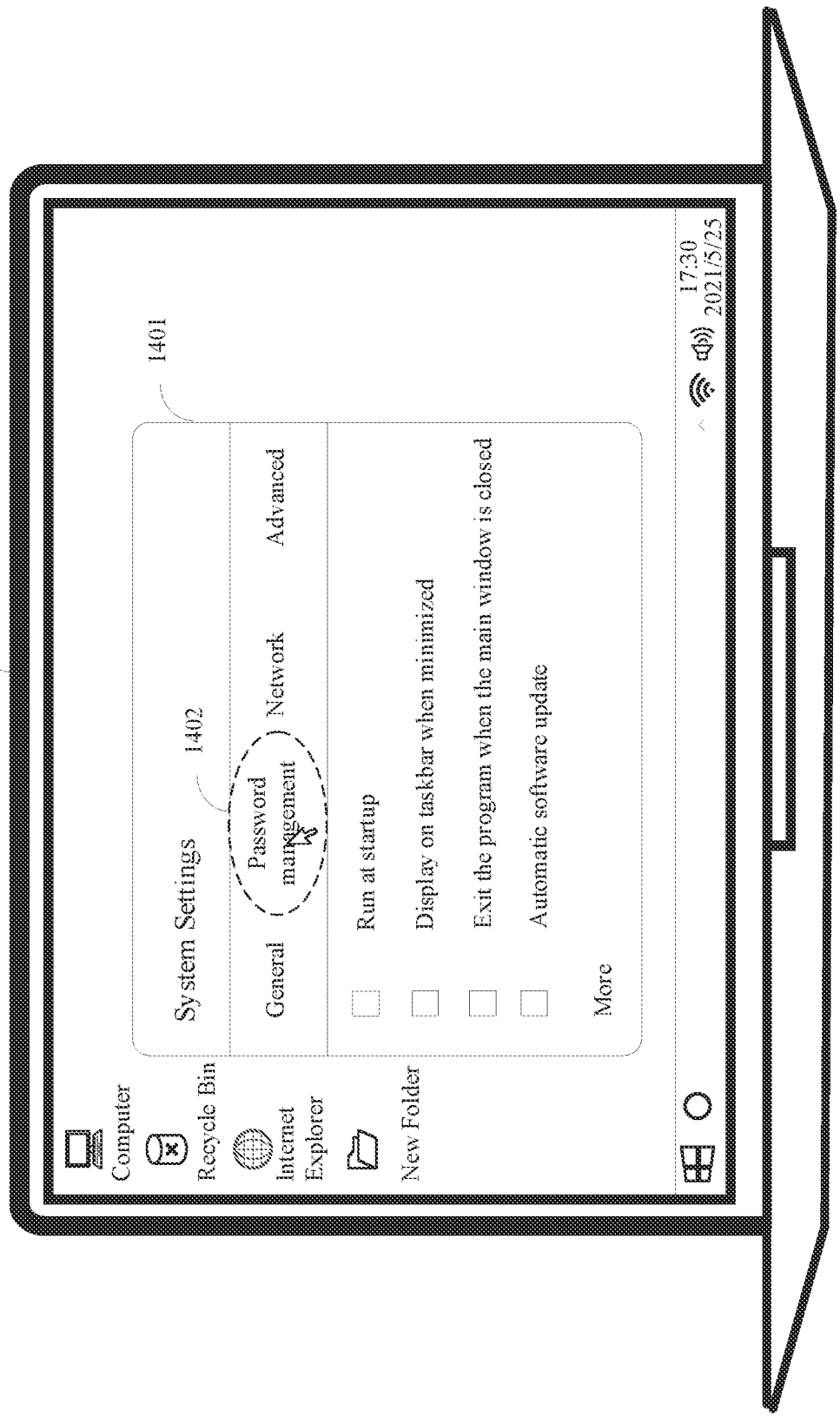
FIG. 14A is a screen diagram of a personal computer 401.
Figure 14B:
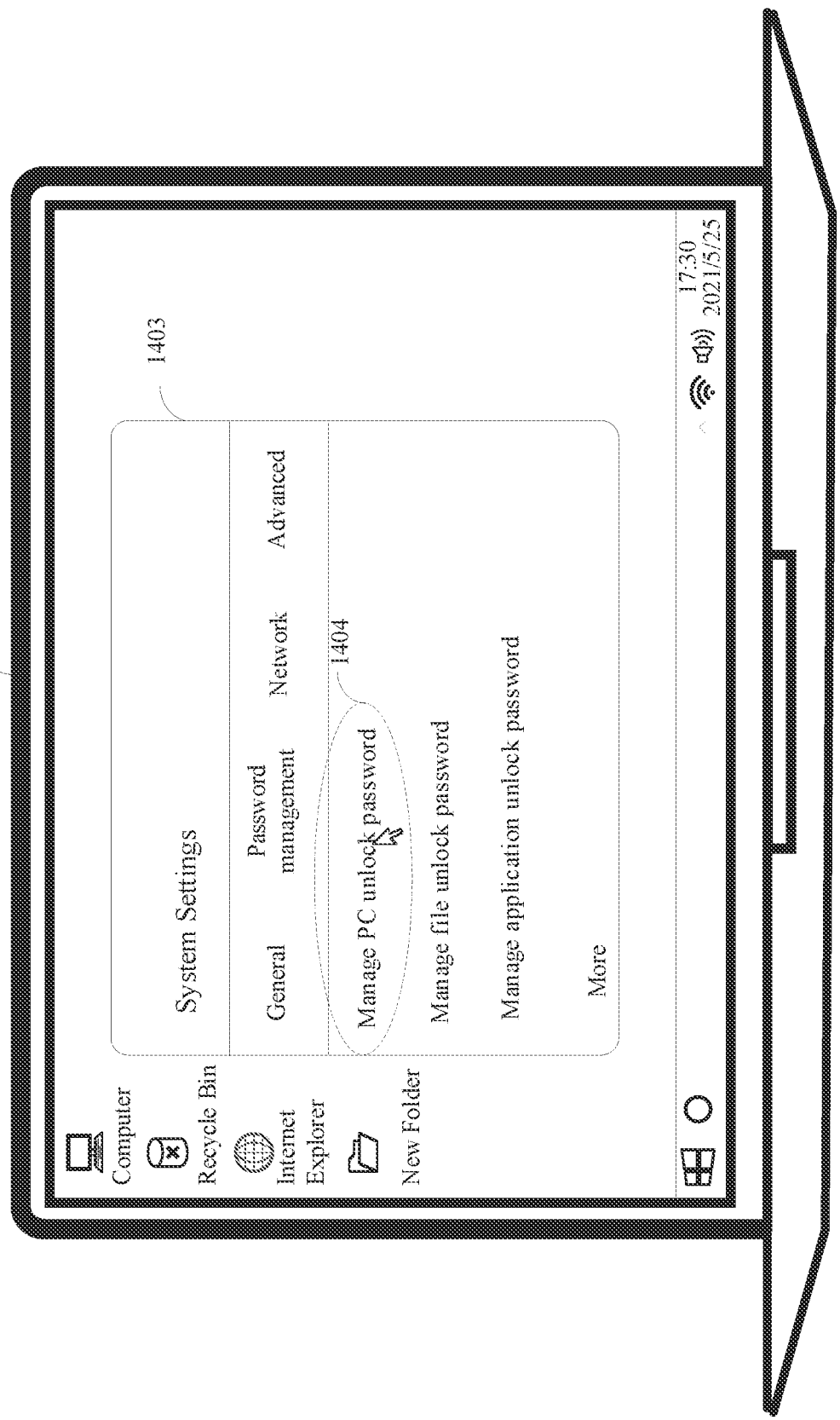
FIG. 14B is a screen diagram of a personal computer 401.
Figure 14C:
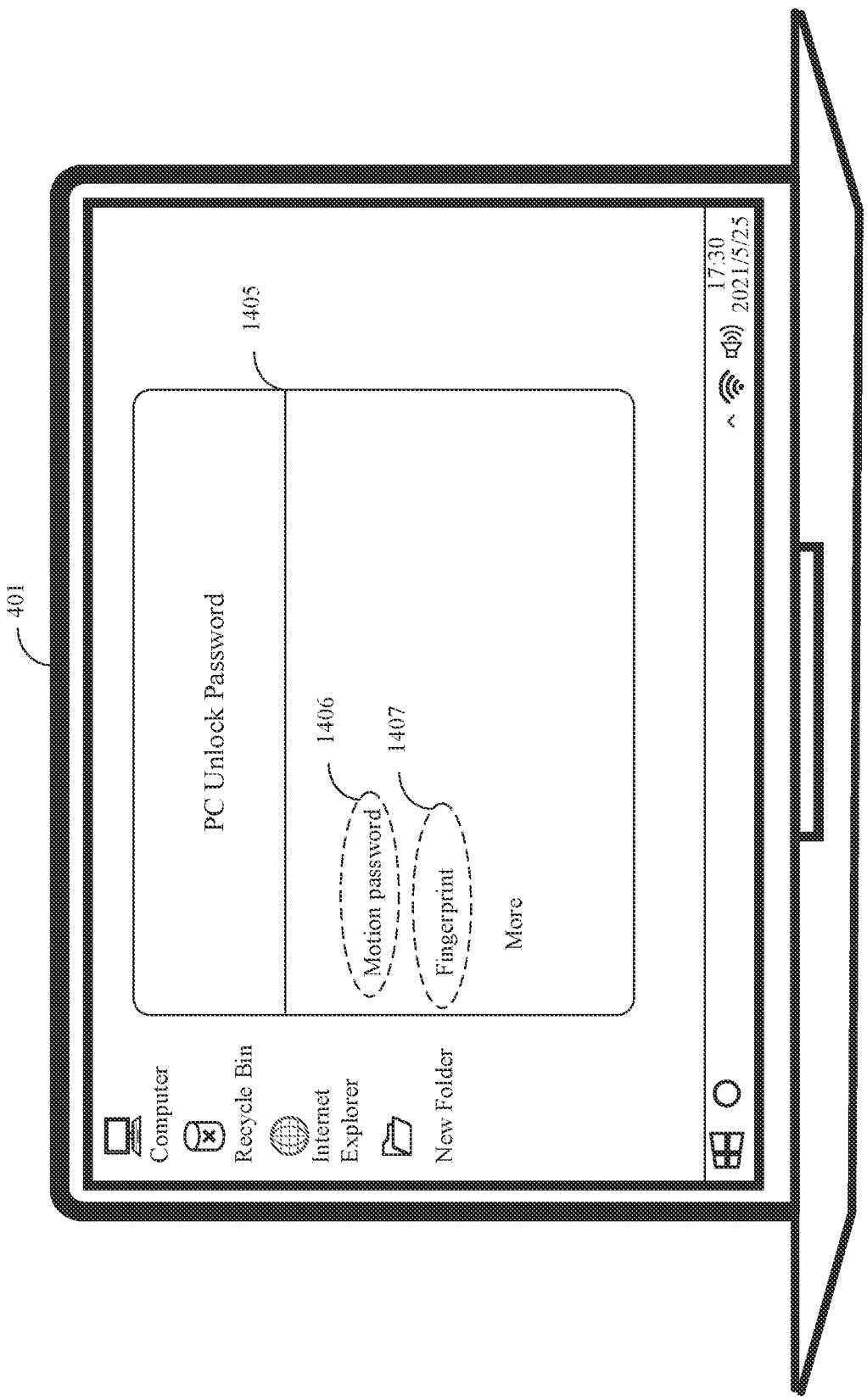
FIG. 14C is a screen diagram of a personal computer 401.

In an optional implementation, the user may further implement fingerprint unlocking by using the smart band 402. For example, as shown in FIG. 14A, the personal computer 401 may display a setting screen 1401 of a smart household application. The setting screen 1401 may include a "General" option, a "Password Management" option 1402, and a "Network" option. The personal computer 401 may receive an operation of the user clicking the "Password Management" option 1402. In response to the operation, the personal computer 401 may display a password management screen 1403, as shown in FIG. 1413. The password management screen 1403 may include a "Manage PC unlock password" option 1404, a "Manage file unlock password" option, and a "Manage application unlock password" option. The personal computer 401 may receive an operation of the user clicking the option 1404. In response to the operation, the personal computer 401 may display a screen 1405 shown in FIG. 14C. The screen 1405 provides the user with a manner of setting different types of passwords. For example, password types may include motion, fingerprint, and face, where a fingerprint option 1407 is used to provide the user with a way to set a fingerprint password. The personal computer 401 may set a fingerprint password in response to an operation of the user (for a process of setting a fingerprint password, reference may be made to the process of setting a gesture password illustrated in FIG. 10 to FIG. 12A, and details are not described herein), and transmit the fingerprint password that is set to the smart band 402. Therefore, when the user needs to unlock the personal computer 401, the user may alternatively put a finger on a fingerprint sensor of the smart band 402 or aim a camera of the smart band 402 at the face, so that the smart band 402 can generate biometric feature information. It can be understood that the biometric feature information includes at least one of fingerprint information or face information. In response to determining that the biometric feature information matches preset reference data, the smart hand 402 sends an unlock request to the personal computer 401, The personal computer 401 may receive the unlock request sent by the smart band 402. In response to the request, the personal computer 401 performs an unlock operation and displays the desktop 1302.

When managing a PC unlock password on the password management screen 1403, the user may set a PC unlock password or change a PC unlock password. In addition, on the password management screen 1403, the user may also manage file and application unlock passwords. The user may set different motion passwords for a PC, a file, and an application. In other words, in response to an operation of the user, the personal computer 401 may also set a file unlock password, an application unlock password, and the like. In this way, the user wearing the smart hand 402 can make different motions to separately implement operations of unlocking the personal computer 401, a file on the personal computer 401, and an application on the personal computer 401.

Figure 15B:
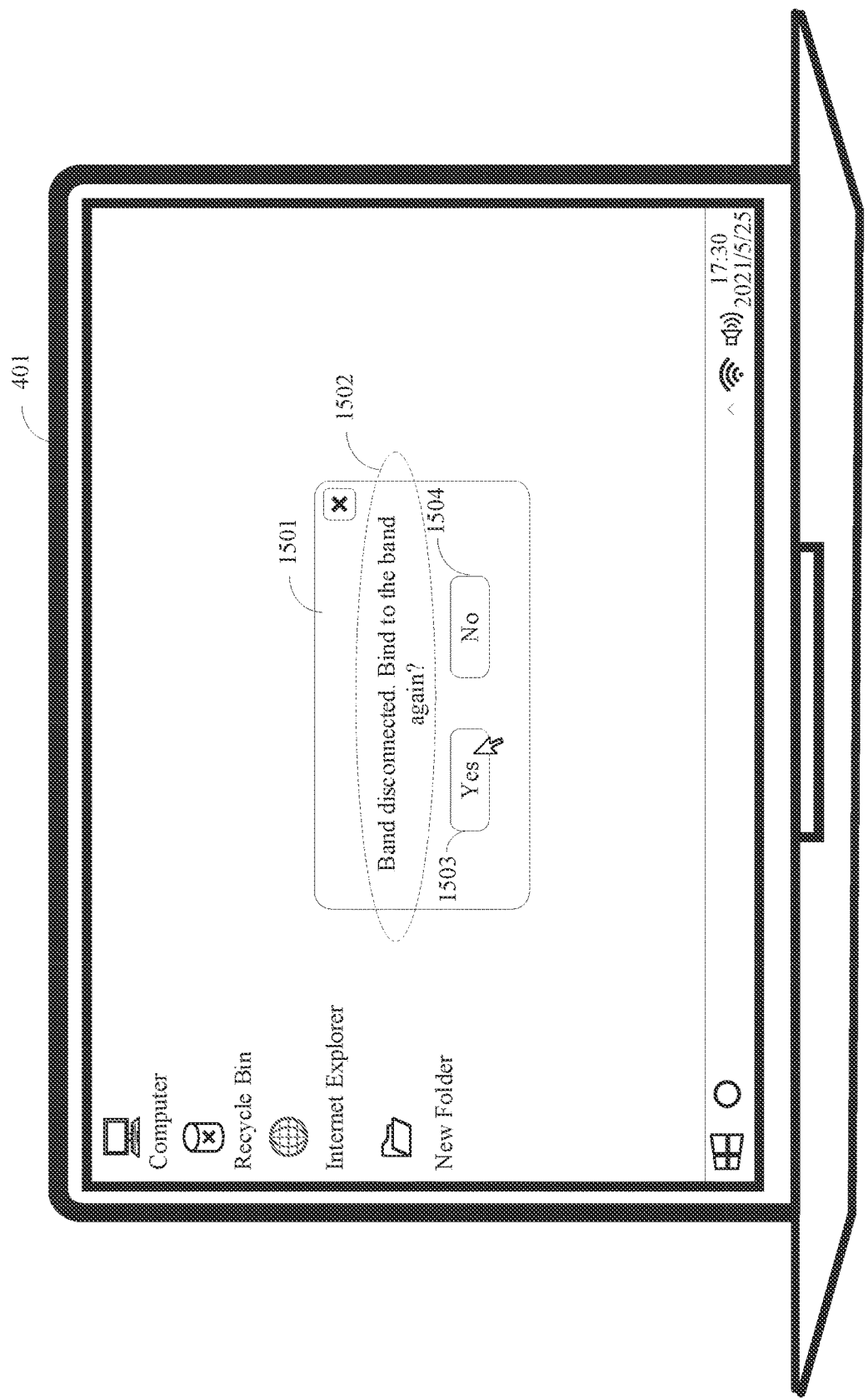
FIG. 15B is a screen diagram of a terminal device.
Figure 16:
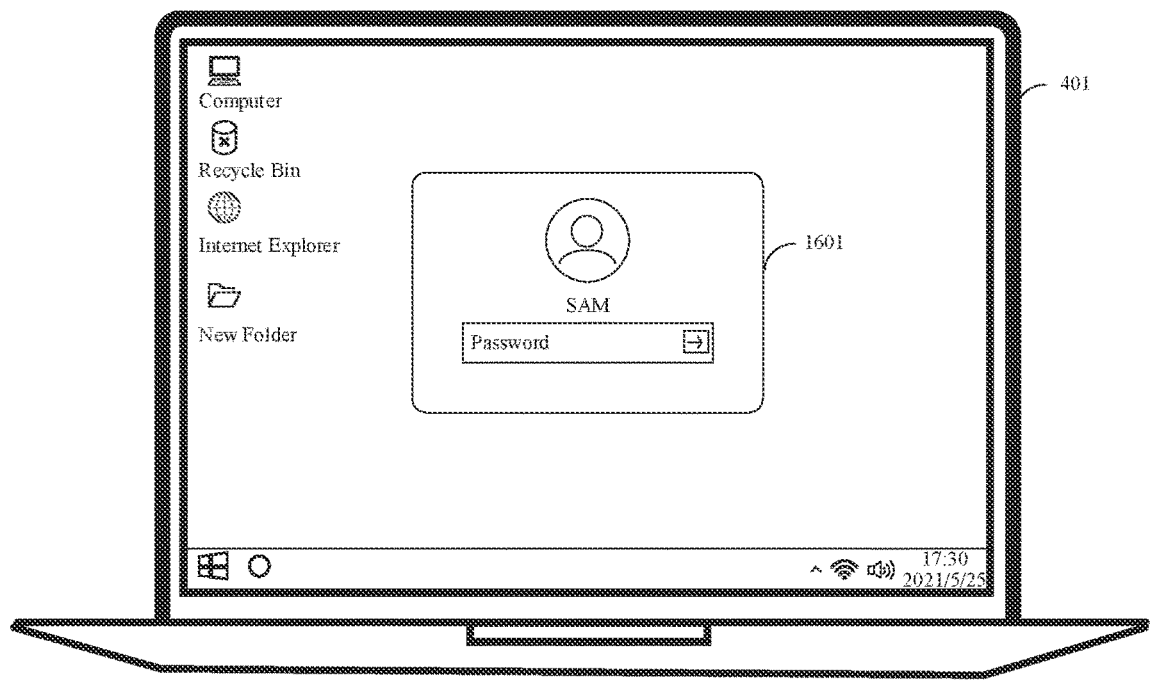
FIG. 16 is a screen diagram of a terminal device.
Figure 16:
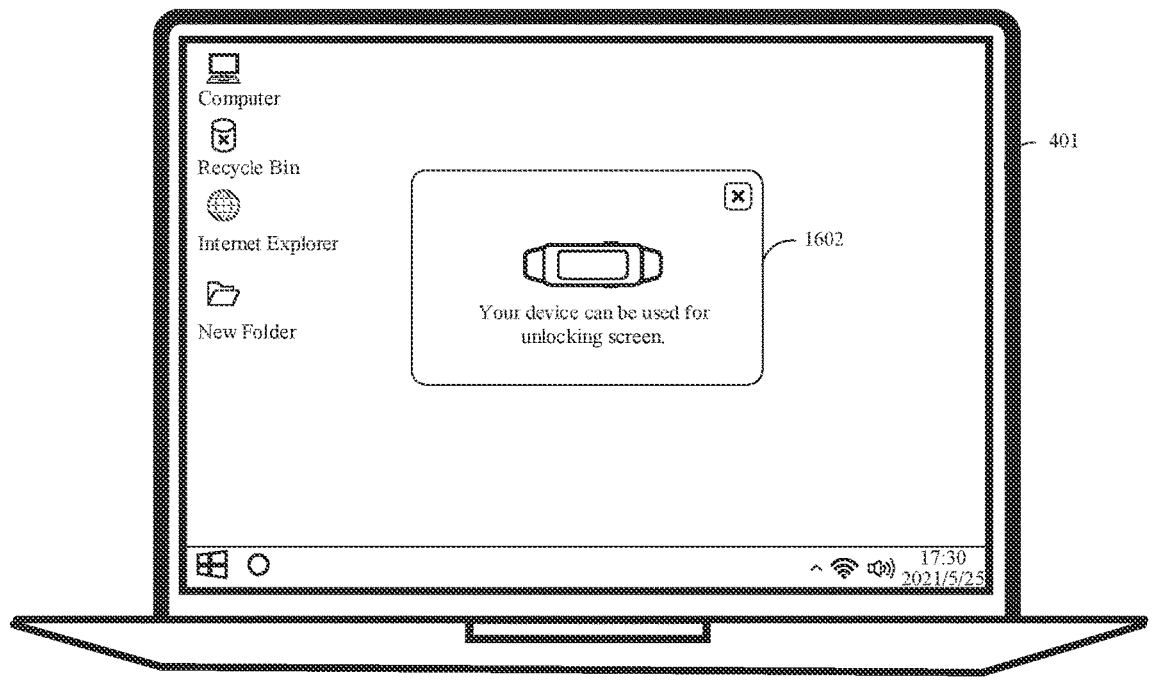

As shown in FIG. 15A, when the smart hand 402 is taken off, the personal computer 401 may display a disconnection prompt box 1501 shown in FIG. 15B. The disconnection prompt box 1501 includes prompt information 1502, a "Yes" option 1503, and a "No" option 1504. The prompt information 1502 is used to prompt the user that the smart band 402 is taken off and the smart band 402 needs to be authenticated again. For example, the prompt information 1502 may be "Band disconnected. Bind to the band again?" In this case, the user may wear the smart band 402 again and click the "Yes" option 1503. The smart band 402 may send wearing status information to the personal computer 401, The personal computer 401 may receive the operation of the user clicking the "Yes" option 1503 and receive the wearing status information sent by the smart hand 402. In response to the operation and the received wearing status information, the personal computer 401 may display a password input box 1601, as shown in FIG. 16(*a*). The password input box 1601 is used for the user to input a password. If a password input by the user is consistent with a preset password, the personal computer 401 may display a function prompt box 1602, as shown in FIG. 16(*b*). The function prompt box 1602 is used to prompt the user that the smart band 401 can be used to perform an unlock operation on the personal computer 401.

Figure 17:
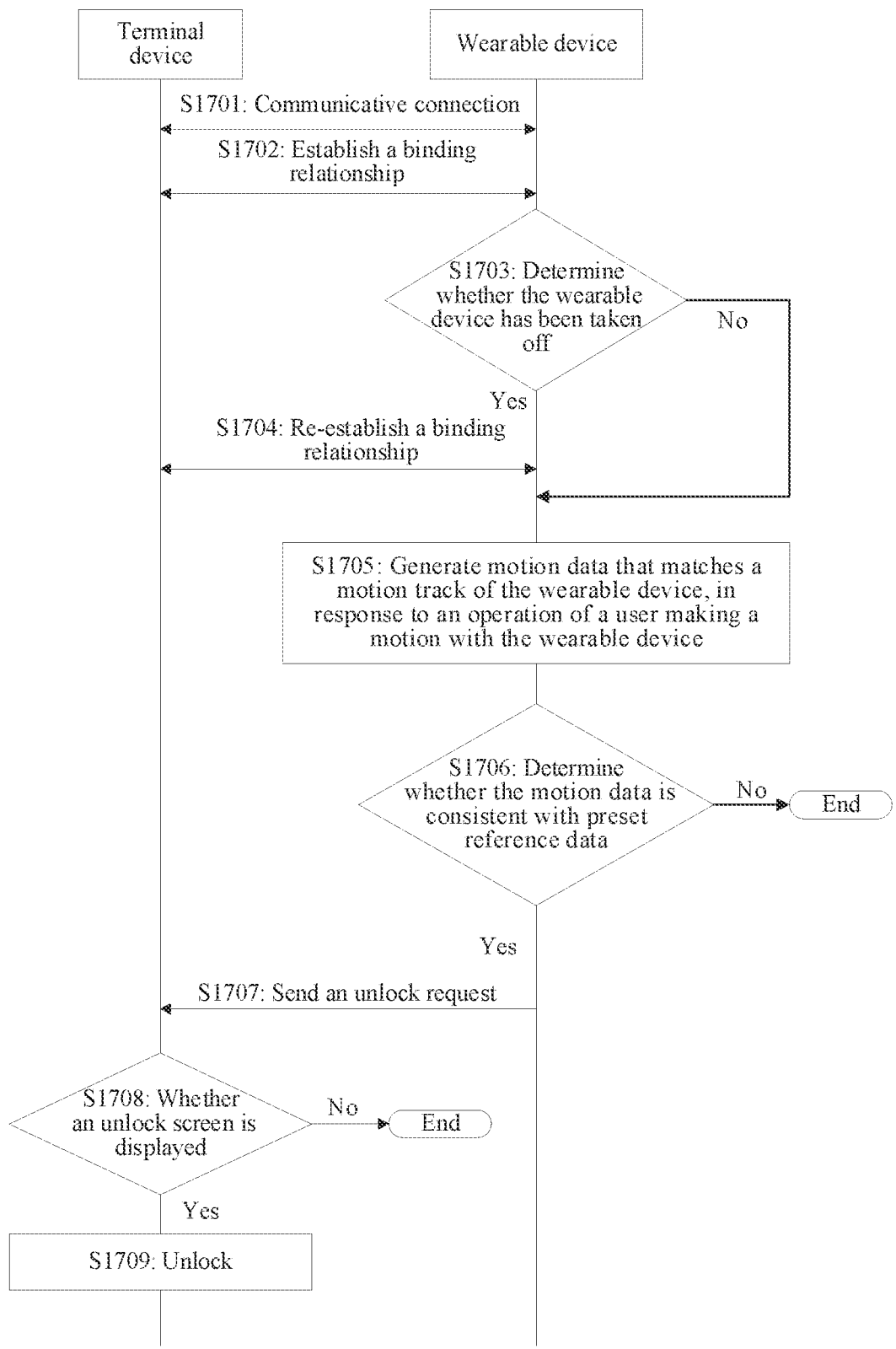
FIG. 17 is a flowchart of a method for unlocking a terminal device by a wearable device according to an embodiment of this application.

Referring to FIG. 17, FIG. 17 is a flowchart of a method for unlocking a terminal device by a wearable device according to an embodiment of this application. The method includes the following steps.

S1701: A terminal device establishes a communicative connection to a wearable device.

Any one of communication manners such as NFC, and bluetooth can be used for communication between the terminal device and the wearable device. For example, the terminal device may be the personal computer 401, and the wearable device may be the smart band 402.

S1702: The terminal device establishes a binding relationship with the wearable device.

It can be understood that establishing the binding relationship may indicate that the terminal device and the wearable device are bound by using a preset account name and a preset password. For example, reference may be made to FIG. 6A to FIG. 9 and corresponding descriptions.

S1703: The wearable device determines whether it has ever been taken off from a user.

If the wearable device has ever been taken off from the user, S1704 is performed. If the wearable device has not been taken off from the user, S1705 is performed.

It can be understood that if the wearable device has ever been taken off from the user, it can be considered that an owner of the smart band 402 may be changed. In this case, there is a security risk in performing an unlock operation. Therefore, the owner of the smart band 402 needs to be authenticated again, and S1705 may be performed. If the wearable device has not been taken off from the user, it can be considered that a wearer of the smart band 402 is not changed, and the smart band 402 has permission to perform an unlock operation on the terminal device 401, S1706 may be performed.

S1704: The wearable device re-establishes a binding relationship with the terminal device.

In an optional implementation, the wearable device may initiate a binding request to the terminal device. After receiving the binding request, the terminal device may display the password input box 1601 shown in FIG. 16(*a*). The user may input a correct password in the password input box 1601 to re-establish a binding relationship between the wearable device and the terminal device.

S1705: The wearable device generates motion data that matches a motion track of the wearable device, in response to an operation of the user making a motion with the wearable device.

For example, as shown in FIG. 13A(b), when the user needs to perform an unlock operation, the user may shake the wrist according, to a preset gesture, to make a motion with the wearable device. The wearable device may identify its own motion track by using a motion sensor and generate motion data that matches the motion track.

S1706: The wearable device determines whether the motion data is consistent with preset reference data.

If the motion data is consistent with the preset reference data, S1707 is performed. If the motion data is inconsistent with the preset reference data, the process ends. For example, the preset reference data may be preset gesture information. For example, reference data may be set by referring to FIG. 10 to FIG. 12B and related descriptions.

S1707: The wearable device sends an unlock request to the terminal device.

S1708: The terminal device determines whether the terminal device is on an unlock screen.

If the terminal device displays the unlock screen, S1709 is performed. If the terminal device does not display the unlock screen, the process ends. It can be understood that if the terminal device displays the unlock screen, it can be considered that the user has an unlock requirement, and therefore an unlock operation is performed. If the terminal device does not display the unlock screen, it can be considered that the user does not have an unlock requirement, and therefore no unlock operation needs to be performed.

Therefore, whether the user has an unlock requirement can be further identified by further determining whether the terminal device displays the unlock screen, which avoids an unlock operation caused by a gesture password that is generated due to an error motion of the user.

S1709: The terminal device performs an unlock operation.

In an optional implementation, the wearable device can be further used to identify biometric feature information of the user, and unlocking is performed by using the biometric feature information. For example, the method further includes: generating, by the wearable device, biometric feature information in response to an unlock operation of the user, where the biometric feature information includes at least one of fingerprint information or face information; and sending, by the wearable device, an unlock request to the terminal device in response to determining that the biometric feature information matches the preset reference data.

In an optional implementation, the method further includes: displaying, by the terminal device, a first screen, where the first screen includes a first option, a second option, and a third option; and for example, the first screen may be the screen 1403 shown in FIG. 14A, the first option may be the "Manage PC unlock password" option 1404, the second option may be the "Manage file unlock password" option, and the third option may be the "Manage application unlock password" option; displaying, by the terminal device, a second screen in response to an operation performed by the user on the first option, where the second screen is used to provide the user with a manner of setting reference data and/or biometric standard information used for unlocking the terminal device; displaying, by the terminal device, a third screen in response to an operation performed by the user on the second option, where the third screen is used to provide the user with a manner of setting a password used for unlocking a preset file; and displaying, by the terminal device, a fourth screen in response to an operation performed by the user on the third option, where the fourth screen is used to provide the user with a manner of setting a password used for unlocking a preset application.

Figure 18:
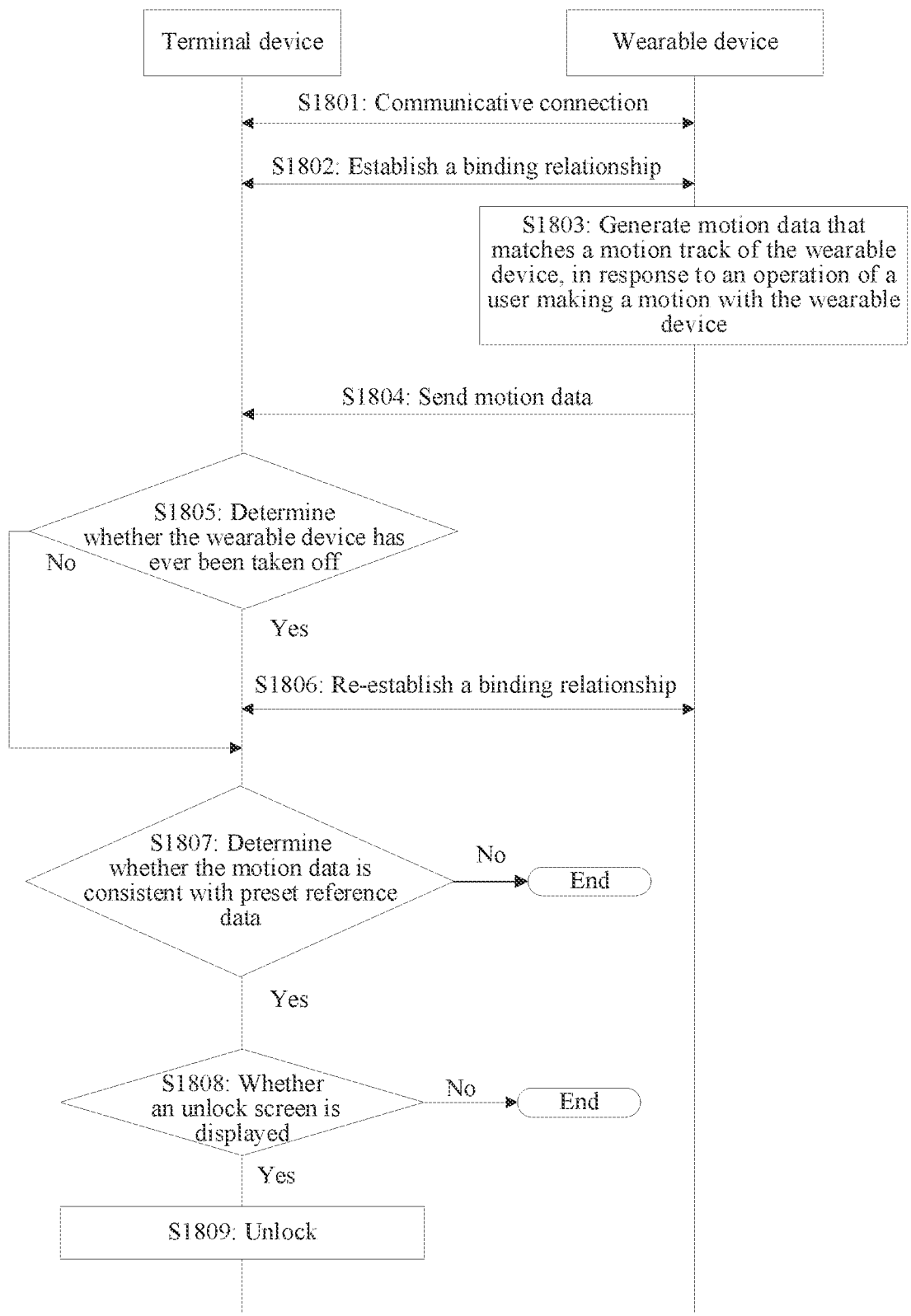
FIG. 18 is a flowchart of another method for unlocking a terminal device by a wearable device according to an embodiment of this application.

Referring to FIG. 18, FIG. 18 is a flowchart of another method for unlocking a terminal device by a wearable device according to an embodiment of this application. It should be noted that the method for unlocking a terminal device by a wearable device provided in this embodiment of this application is similar to the method for unlocking a terminal device by a wearable device shown in FIG. 17 in principle and implementation, except that some functions are implemented by the terminal device. Details are not described below. As shown in FIG. 18, the method includes the following steps.

S1801: A terminal device establishes a communicative connection to a wearable device.

Any one of communication manners such as NFC, Wi-Fi, and bluetooth can be used for communication between the terminal device and the wearable device.

S1802: The terminal device establishes a binding relationship with the wearable device.

It should be noted that the terminal device establishing a binding relationship with the wearable device may indicate that the terminal device and the wearable device are bound by using a preset account name and a preset password.

S1803: The wearable device generates motion data that matches a motion track of the wearable device, in response to an operation of a user making a motion with the wearable device.

S1804: The wearable device sends the motion data to the terminal device.

S1805: The terminal device determines whether the wearable device has ever been taken off.

If the wearable device has ever been taken off, S1806 is performed. If the wearable device has not been taken off, S1807 is performed.

S1806: The terminal device re-establishes a binding relationship with the wearable device.

S1807: The terminal device determines whether the motion data is consistent with preset reference data.

If the motion data is consistent with the preset reference data, S1808 is performed. If the motion data is inconsistent with the preset reference data, the process ends.

S1808: The terminal device determines whether the terminal device is on an unlock screen.

If the terminal device displays the unlock screen, S1809 is performed. If the terminal device does not display the unlock screen, the process ends.

S1809: The terminal device performs an unlock operation.

The operation of determining whether the wearable device has ever been taken off and the operation of determining whether a gesture password is consistent with preset gesture information are performed by the terminal device, which can reduce operation processing loads of the wearable device and spare the need to add excessive functions to the wearable device, thereby helping reduce costs of the wearable device.

In conclusion, the embodiments of this application provide a method for unlocking a terminal device by a wearable device to authenticate an owner of the wearable device, perform detection on a user motion by using the wearable device, and when it is detected that the user motion is consistent with a preset unlock motion and the owner of the wearable device is authenticated successfully, complete an unlock operation on the terminal device. In this way, a user can unlock the terminal device merely through a motion without manually inputting a password, which is convenient and fast and improves user experience. In addition, the owner of the wearable device needs to be authenticated, and the unlock operation can be performed only when the authentication is successful. This can effectively avoid that an unrelated user unlocks the terminal device by using the wearable device, so that security of the terminal device is guaranteed.

The embodiments of this application further provide a method for unlocking a terminal device by a wearable device, which is applied to a wearable device. The method includes: when the wearable device is in a being-worn state, establishing, by the wearable device, a binding relationship with a terminal device, where the binding relationship is used to indicate that the wearable device and the terminal device are bound by using a preset account name and a preset password; re-establishing, by the wearable device, a binding relationship with the terminal device in response to determining that a wearing status of the wearable device is changed from the being-worn state to a not-being-worn state; generating, by the wearable device, motion data that matches a motion track of the wearable device, in response to an operation of a user making a motion with the wearable device; and sending, by the wearable device, an unlock request to the terminal device in response to determining that the motion data matches preset reference data, where the unlock request is used to indicate the terminal device to perform an unlock operation when the terminal device is on an unlock screen.

The embodiments of this application further provide a method for unlocking a terminal device by a wearable device, which is applied to a wearable device. The method includes: when the wearable device is in a being-worn state, establishing, by the wearable device, a binding relationship with a terminal device, where the binding relationship is used to indicate that the wearable device and the terminal device are bound by using a preset account name and a preset password; re-establishing, by the wearable device, a binding relationship with the terminal device in response to determining that a wearing status of the wearable device is changed from the being-worn state to a not-being-worn state; and generating, by the wearable device, motion data that matches a motion track of the wearable device and sending the motion data to the terminal device, in response to an operation of a user making a motion with the wearable device.

The embodiments of this application further provide a method for unlocking a terminal device by a wearable device, which is applied to a terminal device. The method includes: performing, by the terminal device, an unlock operation in response to receiving an unlock request sent by a wearable device and determining that the terminal device is on an unlock screen.

The embodiments of this application further provide a method for unlocking a terminal device by a wearable device, which is applied to a terminal device. The method includes: receiving, by the terminal device, motion data sent by a wearable device; and performing, by the terminal device, an unlock operation in response to determining that the motion data matches preset reference data and determining that the terminal device is on an unlock screen.

Figure 19:
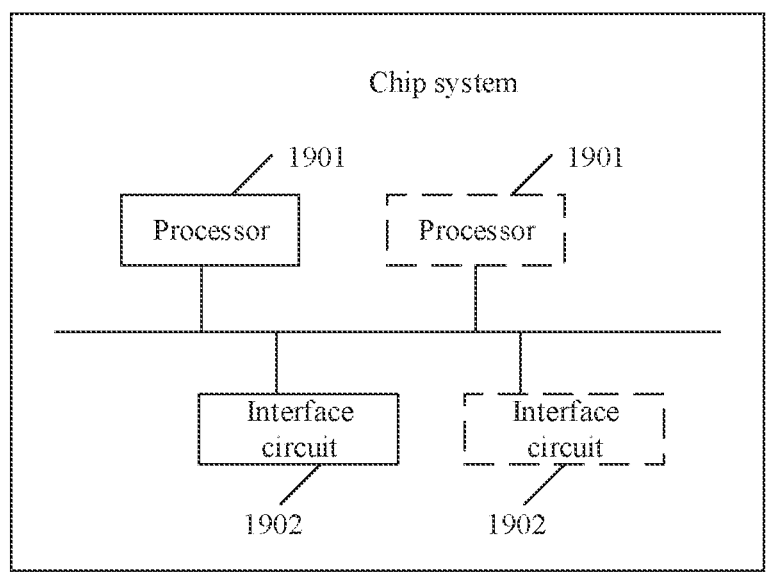
FIG. 19 is a schematic structural diagram of a chip system.

Another embodiment of this application provides a chip system. As shown in FIG. 19, the chip system includes at least one processor 1901 and at least one interface circuit 1902. The processor 1901 and the interface circuit 1902 may be interconnected by a line. For example, the interface circuit 1902 may be configured to receive a signal from another apparatus (for example, a memory of a wearable device or a memory of a terminal device). For another example, the interface circuit 1902 may be configured to transmit a signal to another apparatus (for example, the processor 1901).

For example, the interface circuit 1902 may read instructions stored in a memory of a device and send the instructions to the processor 1901. When the instructions are executed by the processor 1901, the wearable device or the terminal device may be enabled to perform the steps in the foregoing embodiments.

Certainly, the chip system may further include other discrete devices. This is not specifically limited in this embodiment of this application.

Based on the description of the foregoing implementations, a person skilled in the art may clearly understand that, for the purpose of convenient and brief description, division of the foregoing functional modules is used as an example for description. In actual application, the foregoing functions may be allocated to different functional modules and implemented according to a requirement, that is, an internal structure of an apparatus is divided into different functional modules to implement all or a part of the functions described above. For specific working processes of the system, apparatus, and unit described above, reference may be made to corresponding processes in the foregoing method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as a separate product, the integrated unit may be stored in a computer readable storage medium. Based on such an understanding, the technical solutions in the embodiments of this application essentially, or the part contributing to the prior art, or all or part of the technical solutions may be represented in the form of a software product. The computer software product is stored in a storage medium and includes several instructions for instructing a computer device (which may be a personal computer, a server, a network device, or the like) or a processor to perform all or some of the steps of the method described in the embodiments of this application. The storage medium includes various media that can store program code such as a flash memory; a removable hard disk, a read-only memory, a random access memory a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method, comprising:
    establishing a binding relationship between a wearable device and a terminal device when the wearable device is in a being-worn state, wherein the binding relationship indicates that the wearable device and the terminal device are bound by a preset account name and a preset password;
    re-establishing a binding relationship between the wearable device and the terminal device in response to a wearing status of the wearable device changing from the being-worn state to a not-being-worn state;
    generating, by the wearable device, motion data that matches a motion track of the wearable device, in response to a motion of the wearable device;
    generating, by the wearable device, biometric feature information in response to an unlock operation, wherein the biometric feature information comprises at least one of fingerprint information or face information;
    sending, by the wearable device, an unlock request to the terminal device in response to determining, by the wearable device, that the motion data matches preset reference data and the biometric feature information matching preset biometric standard information; and
    performing, by the terminal device, an unlock operation in response to receiving the unlock request and the terminal device displaying an unlock screen.

2. The method of claim 1, wherein establishing the binding relationship between the wearable device and the terminal device comprises:
    displaying, by the terminal device, a first prompt box, wherein the first prompt box prompts the user to establish the binding relationship between the wearable device and the terminal device, and the first prompt box comprises a first option;
    displaying, by the terminal device, a second prompt box in response to a user operation on the first option, wherein the second prompt box reminds the user to wear the wearable device, and the second prompt box comprises a second option;
    sending, by the wearable device, wearing status information to the terminal device in response to the user wearing the wearable device, wherein the wearing status information indicates that the wearable device is in the being-worn state;
    displaying, by the terminal device, a password input prompt box in response to a user operation on the second option and receiving the wearing status information; and
    establishing, by the terminal device, the binding relationship with the wearable device in response to the preset password being input in the password input prompt box.

3. The method of claim 2, wherein establishing the binding relationship between the wearable device and the terminal device in response to the preset password being input in the password input prompt box comprises:
    displaying, by the terminal device, a third prompt box in response to the preset password being input in the password input prompt box, wherein the third prompt box prompts the user to perform a confirm operation in the wearable device; and
    establishing the binding relationship between the wearable device and the terminal device in response to the confirm operation in the wearable device.

4. The method of claim 2, wherein after establishing the binding relationship between the wearable device and the terminal device, the method further comprises:
    displaying, by the terminal device, a fourth prompt box, wherein the fourth prompt box prompts the user to set the reference data, and the fourth prompt box comprises a third option;
    generating, by the wearable device, first motion data that matches a motion track of the wearable device and sending the first motion data to the terminal device, in response to motion of the wearable device;
    displaying, by the terminal device, the fourth prompt box again in response to receiving the first motion data and a user operation on the third option;
    generating, by the wearable device, second motion data that matches a motion track of the wearable device and sending the second motion data to the terminal device, in response to motion of the wearable device again;

sending, by the terminal device, a reference data setting instruction to the wearable device in response to the user operation on the third option and the first motion data matching the second motion data; and setting, by the wearable device, the second motion data as the reference data in response to the reference data setting instruction.

5. The method of claim 4, further comprising displaying, by the terminal device, a fifth prompt box in response to the user operation on the third option and the first motion data matching the second motion data, wherein the fifth prompt box indicates that the user is able to unlock the terminal device with the wearable device.

6. The method of claim 1, wherein after establishing the binding relationship between the wearable device and the terminal device, the method further comprises displaying, by the terminal device, a sixth prompt box, wherein the sixth prompt box indicates that the terminal device has established the binding relationship with the wearable device.

7. The method of claim 4, further comprising:

displaying, by the terminal device, a first screen, wherein the first screen comprises the first option, the second option, and the third option;

displaying, by the terminal device, a second screen in response to the user operation on the first option, wherein the second screen provides the user with a manner of setting reference data and/or biometric standard information used for unlocking the terminal device;

displaying, by the terminal device, a third screen in response to the user operation on the second option, wherein the third screen provides the user with a manner of setting a password for unlocking a preset file; and displaying, by the terminal device, a fourth screen in response to the user operation on the third option, wherein the fourth screen provides the user with a manner of setting a password for unlocking a preset application.

8. A method, comprising:

establishing a binding relationship between a wearable device and a terminal device when the wearable device is in a being-worn state, wherein the binding relationship indicates that the wearable device and the terminal device are bound by a preset account name and a preset password;

re-establishing a binding relationship between the wearable device and the terminal device in response to a wearing status of the wearable device changing from the being-worn state to a not-being-worn state;

generating, by the wearable device, motion data that matches a motion track of the wearable device, in response to a motion of the wearable device;

generating, by the wearable device, biometric feature information in response to an unlock operation, wherein the biometric feature information comprises at least one of fingerprint information or face information; and sending, by the wearable device, an unlock request to the terminal device in response to determining, by the wearable device, that the motion data matches preset reference data and the biometric feature information matching preset biometric standard information, wherein the unlock request indicates to the terminal device to perform an unlock operation when the terminal device displays an unlock screen.

9. A method comprising:

displaying, by a terminal device, a first prompt box when a wearable device is in a being-worn state, wherein the first prompt box prompts a user to establish a binding relationship between the wearable device and the terminal device, and the first prompt box comprises a first option;

displaying, by the terminal device, a second prompt box in response to a user operation on the first option, wherein the second prompt box reminds the user to wear the wearable device, and the second prompt box comprises a second option;

sending, by the wearable device, wearing status information to the terminal device in response the user wearing the wearable device, wherein the wearing status information indicates that the wearable device is in the being-worn state;

displaying, by the terminal device, a password input prompt box in response to a user operation on the second option and receiving the wearing status information;

establishing the binding relationship between the wearable device and the terminal device in response to a preset password being input in the password input prompt box;

re-establishing, after the wearing status of the wearable device changes from the being-worn state to a not-being-worn state, the binding relationship between the wearable device and the terminal device in response to the wearable device changing to the being-worn state again;

generating, by the wearable device, motion data that matches a motion track of the wearable device, in response to a motion of the wearable device;

generating, by the wearable device, biometric feature information in response to an unlock operation, wherein the biometric feature information comprises at least one of fingerprint information or face information;

sending, by the wearable device, an unlock request to the terminal device in response to determining, by the wearable device, that the motion data matches preset reference data and the biometric feature information matching preset biometric standard information; and performing, by the terminal device, an unlock operation in response to receiving the unlock request and the terminal device displaying an unlock screen.

10. The method of claim 9, wherein establishing the binding relationship between the wearable device and the terminal device in response to the preset password being input in the password input prompt box comprises:

displaying, by the terminal device, a third prompt box in response to the preset password being input in the password input prompt box, wherein the third prompt box prompts the user to perform a confirm operation in the wearable device; and establishing the binding relationship between the wearable device and the terminal device in response to the confirm operation in the wearable device.

11. The method of claim 9, wherein after establishing the binding relationship between the wearable device and the terminal device, the method further comprises:

displaying, by the terminal device, a fourth prompt box, wherein the fourth prompt box prompts the user to set the reference data, and the fourth prompt box comprises a third option;

generating, by the wearable device, first motion data that matches a motion track of the wearable device and sending the first motion data to the terminal device, in response to a motion of the wearable device;

displaying, by the terminal device, the fourth prompt box again in response to receiving the first motion data and a user operation on the third option;

generating, by the wearable device, second motion data that matches a motion track of the wearable device and sending the second motion data to the terminal device, in response to a motion of the wearable device again;

sending, by the terminal device, a reference data setting instruction to the wearable device in response to the user operation on the third option and the first motion data matching the second motion data; and setting, by the wearable device, the second motion data as the reference data in response to the reference data setting instruction.

12. The method of claim 11, further comprising displaying, by the terminal device, a fifth prompt box in response to the user operation on the third option and the first motion data matching the second motion data, wherein the fifth prompt box indicates that the user is able to unlock the terminal device with the wearable device.

13. The method of claim 9, wherein after establishing the binding relationship between the wearable device and the terminal device, the method further comprises displaying, by the terminal device, a sixth prompt box, wherein the sixth prompt box indicates that the terminal device has established the binding relationship with the wearable device.

14. The method of claim 11, further comprising:
displaying, by the terminal device, a first screen, wherein the first screen comprises the first option, the second option, and the third option;

displaying, by the terminal device, a second screen in response to the user operation on the first option, wherein the second screen provides the user with a manner of setting reference data and/or biometric standard information used for unlocking the terminal device;

displaying, by the terminal device, a third screen in response to the user operation on the second option, wherein the third screen provides the user with a manner of setting a password for unlocking a preset file; and displaying, by the terminal device, a fourth screen in response to the user operation on the third option, wherein the fourth screen provides the user with a manner of setting a password for unlocking a preset application.

15. The method of claim 8, further comprising sending, by the wearable device, wearing status information to the terminal device in response to the user wearing the wearable device, wherein the wearing status information indicates that the wearable device is in the being-worn state, and wherein the binding relationship is established with the wearable device in response to the preset password being input in a password input prompt box on the terminal device in response to the terminal device receiving the wearing status information.

16. The method of claim 8, wherein after establishing the binding relationship between the wearable device and the terminal device, the method further comprises:
generating, by the wearable device, first motion data that matches a motion track of the wearable device and sending the first motion data to the terminal device, in response to a motion of the wearable device;

generating, by the wearable device, second motion data that matches a motion track of the wearable device and sending the second motion data to the terminal device, in response to a motion of the wearable device again;

receiving, from the terminal device, a reference data setting instruction to the wearable device in response to the first motion data matching the second motion data; and setting, by the wearable device, the second motion data as the reference data in response to the reference data setting instruction.

17. The method of claim 8, further comprising re-establishing, after the wearing status of the wearable device changes from the being-worn state to a not-being-worn state, the binding relationship between the wearable device and the terminal device in response to the wearable device changing to the being-worn state again.

18. The method of claim 17, further comprising initiating a binding request to the terminal device, wherein the binding request is configured to cause the terminal device to display a password input box, and wherein a user inputting the preset password in the password input box re-establishes the binding relationship between the wearable device and the terminal device.

19. The method of claim 1, further comprising initiating a binding request to the terminal device, wherein the binding request is configured to cause the terminal device to display a password input box, and wherein a user inputting the preset password in the password input box re-establishes the binding relationship between the wearable device and the terminal device.

20. The method of claim 9, further comprising initiating a binding request to the terminal device, wherein the binding request is configured to cause the terminal device to display a password input box, and wherein a user inputting the preset password in the password input box re-establishes the binding relationship between the wearable device and the terminal device.

* * * * *